United States Patent [19]

Inoue et al.

[11] Patent Number: 5,005,093

[45] Date of Patent: Apr. 2, 1991

[54] RECORDING AND/OR REPRODUCING APPARATUS WITH CARTRIDGE LOCK MECHANISM

[75] Inventors: Yoshihisa Inoue, Saitama; Yasunori Arai, Tokyo, both of Japan

[73] Assignee: Nakamichi Corporation, Tokyo, Japan

[21] Appl. No.: 450,246

[22] Filed: Dec. 13, 1989

Related U.S. Application Data

[63] Continuation of Ser. No. 265,212, Oct. 31, 1988, Pat. No. 4,899,238.

[30] Foreign Application Priority Data

Oct. 31, 1987 [JP] Japan .............................. 62-276778

[51] Int. Cl.⁵ ............................................. G11B 5/012
[52] U.S. Cl. .................................. 360/99.06; 369/77.2
[58] Field of Search ............... 360/99.06, 99.07, 98.08, 360/99.02, 99.03; 369/77.2, 270–271, 258, 262

[56] References Cited

U.S. PATENT DOCUMENTS 4,829,504  5/1989  Sunaga ................................ 369/77.2

Primary Examiner—A. J. Heinz
Attorney, Agent, or Firm—Dykema Gossett

[57] ABSTRACT

A recording and/or reproducing apparatus includes a cartridge receiving holder, a cartridge shutter opening device for opening a laterally slideable shutter of a disc cartridge along with insertion thereof into the holder, a mount base displaceable between a retracted position away from the holder and an operative position in which a head and spindle motor mounted on the base will be made operative with respect to a disc contained in the full-loaded disc cartridge in the holder. The disc cartridge is retained in the full-loaded position in the holder through engagement between a lock lever rotatably mounted on the holder and a notch formed on the side periphery of the disc cartridge. The lock lever is normally biased by a spring to direct outwardly so that the disc cartridge is free from contract with the lock lever during insertion into the holder. When the disc cartridge has reached the full-loaded position, a sliding plate is sprung back toward a direction opposite to the cartridge inserting direction, upon which the lock lever is actuated and then the mount base is shifted to the operative position.

9 Claims, 21 Drawing Sheets

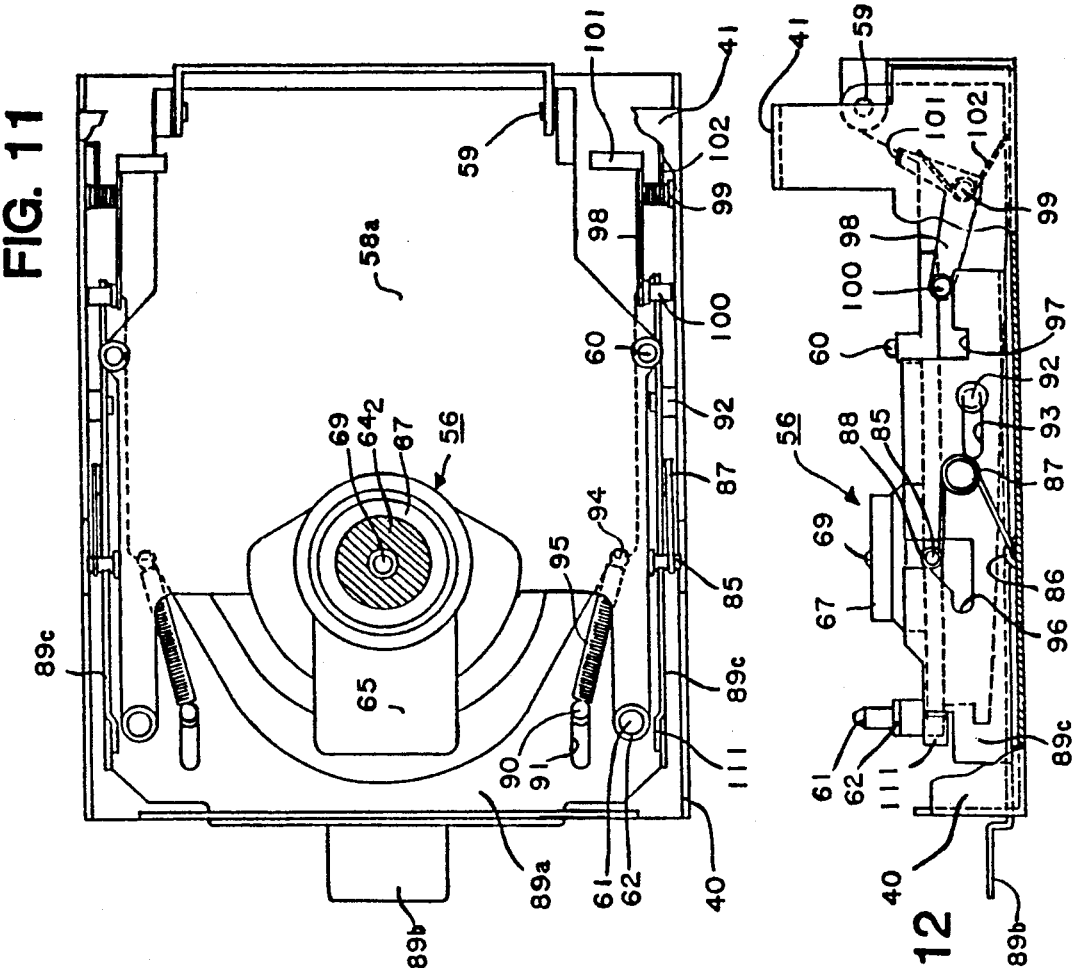

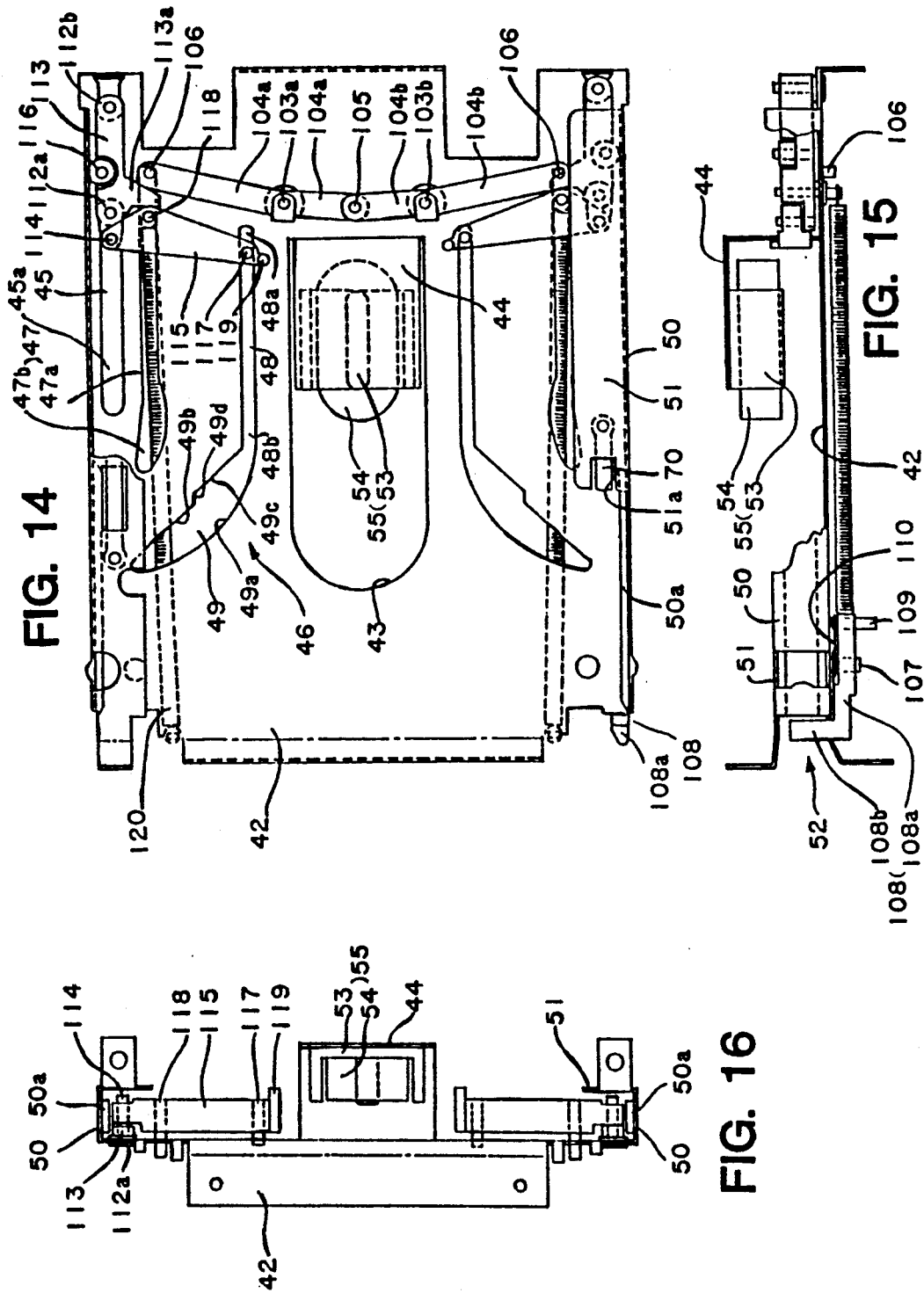

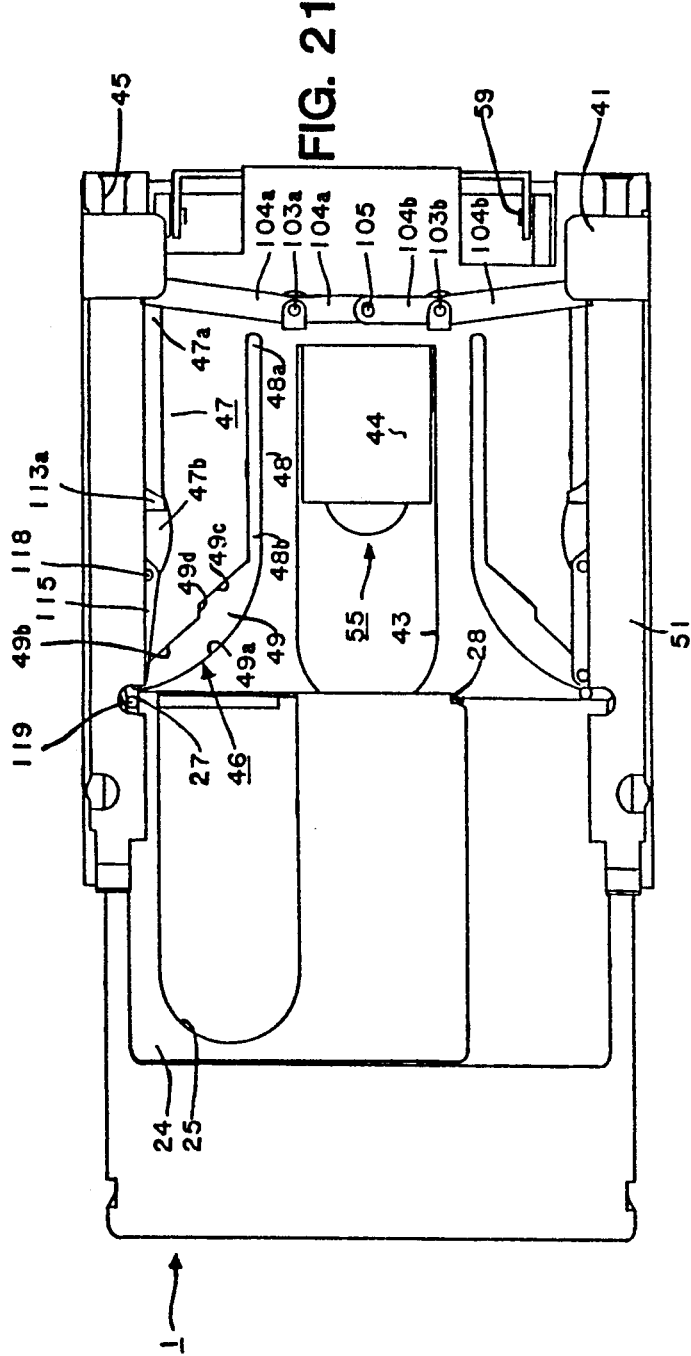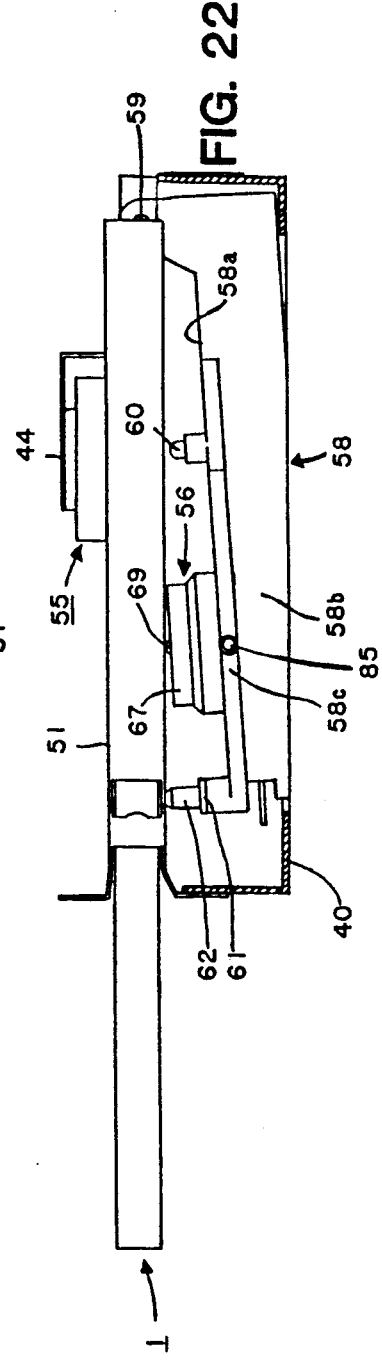

RECORDING AND/OR REPRODUCING APPARATUS WITH CARTRIDGE LOCK MECHANISM

This is a continuation of copending application Ser. No. 265,212, filed on Oct. 31, 1988 now U.S. Pat. No. 4,899,238.

BACKGROUND OF THE INVENTION

1. Field of the Invention

This invention relates to a recording and/or reproducing apparatus equipped with a cartridge lock mechanism used in combination with the recording and/or reproducing apparatus along with insertion and discharge of the disc cartridge.

2. Description of the Prior Art

As a medium of magnetic or magneto optical recording and reproducing, it has recently been known a magnetic or magneto optical disc.

In the U.S. Pat. No. 4,517,617 issued to Ohkawara, there is disclosed a disc cartridge comprising a hard jacket made from such material as plastic. The recording disc is substantially enveloped within the hard jacket for preventing damage and contamination of the disc itself and/or a recording area thereof which otherwise might occur when handling the disc or inserting it into the recording and reproducing apparatus. The hard jacket is provided with an aperture for insertion of a magnetic head mounted on the recording and reproducing apparatus when installed or loaded thereon. This head insertion aperture is normally closed by a shutter member slideably connected to the hard jacket, capable of preventing dust or fingerprints from entering through the head insertion aperture and therefore preventing contamination of the recording area of the disc. The shutter is provided with an access window which will allow the magnetic head to obtain access to the recording area of the disc, when the disc cartridge is loaded into the apparatus, for performing desired recording and/or reproducing operation.

With the system and apparatus disclosed in the above-referred U.S. Pat. No. 4,517,617 the shutter must be hand-manipulated to be laterally slid or opened before the disc cartridge is loaded into the apparatus, and after completing desired recording and/or reproducing operation and then discharging the disc cartridge out of the apparatus, the shutter must be closed by the operator's hand, which is troublesome. Further, fingerprints or other foreign matter would be adhered to the recording area of the disc when manipulating the disc cartridge for opening or closing the shutter.

This problem can be solved by a mechanism or device capable of automatically opening and closing the shutter as the disc cartridge is being inserted into the apparatus and discharted out of the apparatus. A typical one of such device is disclosed in the Japanese Utility-Model Publication Sho. 62-15895, which includes an operating lever rotatably mounted on the recording and reproducing apparatus and a cut-out notch formed at one side of the front edge of the shutter. The lever has at its one end a vertical pivot connected to the apparatus and at the other end a leading end in engagement with the notch of the shutter, said one end forward a direction opposite to the cartridge loading direction and the other end forward a direction opposite to the cartridge ejecting direction. During the cartridge loading or advancing operation, the engagement between the other end of the lever and the notch will cause the shutter to automatically open. While, in turn, the cartridge is being ejected away from the loaded position in the apparatus, the lever is rotated in the opposite direction due to a spring means connected to the apparatus, as well as another spring means connected between the shutter and the hard jacket for normally biasing the shutter toward the closed position, thereby automatically closing the shutter.

In the above-referred prior art device, the lever is arranged substantially above the shutter of the disc cartridge which is full-loaded in a holder of the magnetic recording and reproducing apparatus and there is required a considerable space for installing the shutter operating mechanism above the apparatus. In another type recording and reproducing apparatus for use in combination with magneto optical disc, however, as known, it will be necessary to mount a bias magnet on the apparatus in opposition to an optical head mechanism, across the disc in the cartridge installed in the loaded position, which becomes difficult or practically impossible to install the shutter operating lever substantially above the shutter as in the same manner in the prior art device.

We have attempted that the aforementioned prior art arrangement of the shutter operating lever be modified such that the pivot is mounted relatively in the backside of the apparatus with the engaging end oriented toward the cartridge loading direction. However, realization of such arrangement has been found difficult because a relatively great angle should be provided between the lever and the cartridge in order to actuate the shutter without a hitch, and the lever has a length in a limited range which is of necessity determined in correspondence with a stroke required for opening and closing the shutter. This will be especially difficult where the notch formed in the front edge of the shutter is arranged in close vicinity to the side face of the disc cartridge, leaving only a limited space available on the apparatus for mounting the pivot of the lever arranged outwardly of the side face of the disc cartridge. In the U.S. Pat. No. 4,688,123 issued to Sokol et al, there is also disclosed a shutter actuating mechanism. In particular reference to FIG. 7 to FIG. 9 of this prior art, as the disc cartridge 23 advances into the holder, rotation of the arm 120 will cause the shutter 27 to open. When the disc cartridge has reached the full-loaded position shown in FIG. 9, the leading end 121 of the arm 120 is engaged with the notch 31 formed in the front edge of the disc cartridge to the lock the disc cartridge in the full-loaded position. If the notch 31 or an equivalent element should not be formed in the front edge of the disc cartridge, the disc cartridge would tend to be discharged out of the cartridge holder by means of a spring for biasing the shutter toward the closed position and another spring for biasing the arm toward clockwise rotation.

It is therefore an object of the invention to provide a recording and/or reproducing apparatus equipped with a novel cartridge lock mechanism for locking a disc cartridge in a full-loaded position, which has much applicability to shape or construction of the disc cartridge rather than the prior art one.

Another object of the invention is to provide a novel recording and/or reproducing apparatus in which smooth insertion of a disc cartridge into a cartridge holder can be achieved.

In accordance with an aspect of the invention there is provided a recording and/or reproducing apparatus for performing the recording and/or reproducing operation with respect to a disc contained in a disc cartridge, comprising a holder for accommodating the disc cartridge; shutter actuating means for opening a laterally slidable shutter of the disc cartridge along with insertion thereof into the holder in a direction substantially perpendicular to the sliding direction of the shutter; a base for mounting thereon a head in opposition to one side of the disc and a spindle motor for rotating the disc, the base being displaceable between a first position retracted away from the holder and a second position close to the holder to make operative the head and the spindle with respect to the disc contained in the full-loaded disc cartridge in the holder; cartridge lock means for locking the disc cartridge in a full-loaded position, including a lock lever engageable with a corresponding engaging portion of the disc cartridge and first spring means for biasing the lock lever toward a direction in which engagement between the lock lever and the corresponding engaging portion is released; detect means for detecting that the disc cartridge has reached the full-loaded position in the holder; and control means operated in response to detection by the detect means to actuate the cartridge lock means against the first spring means to lock the disc cartridge in the full-loaded position and then to shift the base to the second position.

BRIEF DESCRIPTION OF THE DRAWINGS

The above and other objects and features of the invention will be apparent from the following description of a preferred embodiment thereof when read in conjunction with the accompanying drawings in which:

FIGS. 11, 12 and 13 are a top view, a side view partly in section and a front view respectively, showing especially a main chassis, a sliding plate, a base plate and other components and parts associated therewith of a recording and reproducing apparatus embodying the invention, provided the disc cartridge is full-loaded into the apparatus, though the disc cartridge itself is not shown;

FIGS. 14, 15 and 16 are a top view, a side view and a front view respectively, showing especially a cartridge holder, a shutter actuating mechanism and a cartridge locking mechanism of the apparatus, provided the disc cartridge is full-loaded into the apparatus, though the disc cartridge itself is not shown;

FIGS. 19 through 22 illustrates the apparatus in the cartridge ejected condition, in which FIGS. 19 and 20 are top and side views showing the apparatus, exclusive of the motor and the optical head mechanism, together with the disc cartridge in an ejected position, FIGS. 21 and 22 are top and side views showing the apparatus, exclusive of a sliding plate locking mechanism and the optical head mechanism, together with the disc cartridge in the ejected position;

DESCRIPTION OF THE PREFERRED EMBODIMENT

Figure 1:
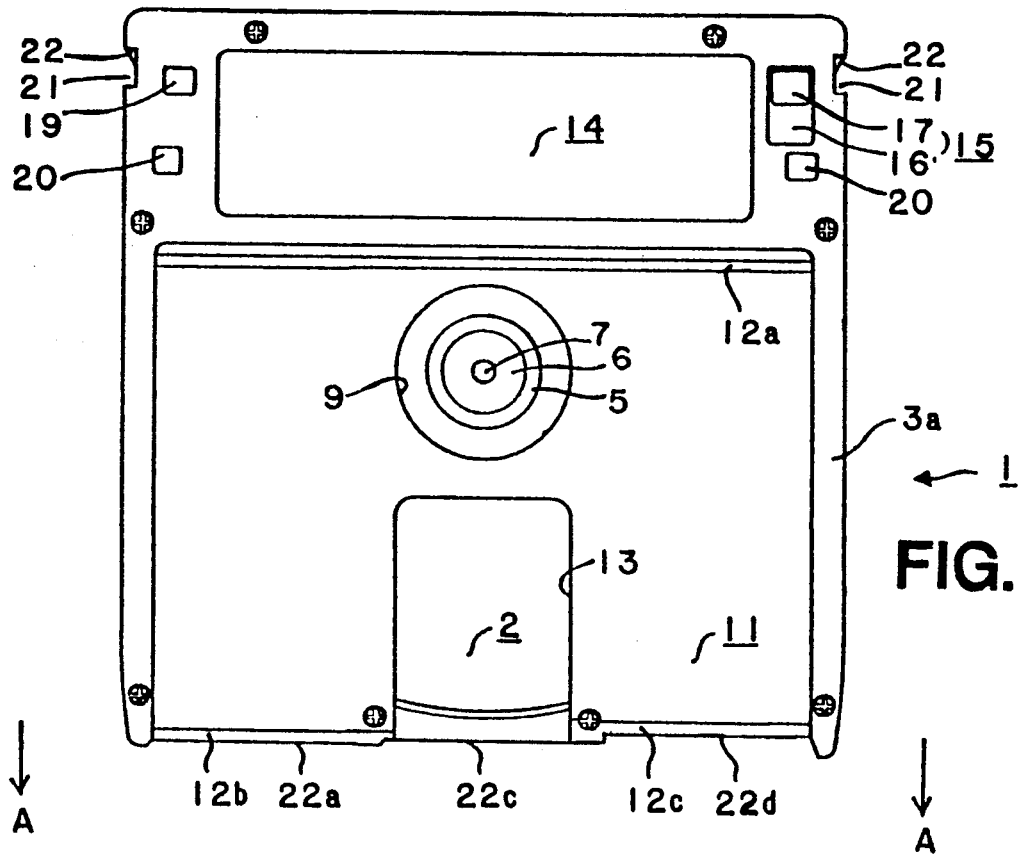
FIGS. 1, 2 and 3 are top, front and bottom views respectively, showing a disc cartridge adapted to be used for a recording and reproducing apparatus according to the invention, from which a shutter is detached.

FIGS. 1 to 4 show a disc cartridge adapted to be used with a recording and/or reproducing apparatus according to a preferred embodiment of this invention. In these drawings a shutter has been removed from the disc cartridge. This disc cartridge 1 comprises a disc-shaped recording medium (this term will be hereinlater referred to simply as "disc") 2 such as magnetic disc and magneto optical disc, which is contained in a substantially flat, box-shaped hard jacket 3 made from hard plastic material, for example.

Disc 2 is particularly a magneto optical disc having recording areas on both sides. Disc 2 is provided with a circular center opening 4 surrounded by ring-like raised flanges 5 on both sides as particularly seen in FIG. 18. Above each of outer face of disc 2, a magnetic center plate 6 of a ferromagnetic material such as steel is supported by the raised flange 5 and extend in parallel to the disc face with a predetermined small distance therebetween. The magnetic center plate 6 is provided with a circular center hole 7 for insertion of a spindle of a motor when the disc cartridge (this term will be hereinlater referred to simply as "cartridge") 1 takes a loaded position wherein it is completely loaded to the recording/reproducing apparatus for performing desired recording and/or reproducing operation.

Figure 18:
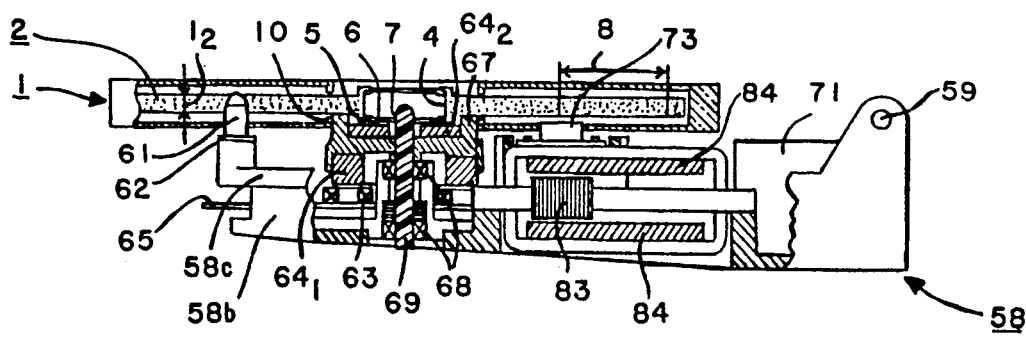

The hard jacket 3 is assembled by joining together an upper half 3a and a lower half 3b with suitable screw means. Each of halves 3a and 3b is provided at a center thereof with a spindle insertion aperture 9 surrounded by an inwardly raised ring-like projection 10 (FIG. 18). The projecting depth of projection 10 is so determined as to provide a distance between the opposited two projections 10 in the hard jacket 3, as assembled, which is somewhat larger than the thickness of disc 2, whereby disc 2 is allowed to be slightly moved in the up-and-down direction within a range restricted between the opposite two projections 10. Also, disc 2 is displaceable in a horizontal direction with respect to the hard jacket 3 because there is a small clearance between the inner edges of the hard jacket 3 and the outer peripheral of disc 2. In summary, there is provided the looseness of disc 2 fitted in the hard jacket 3 both in vertical and lateral directions. However, once the cartridge 1 is placed into the loaded condition, the vertical displacement of disc 2 is prevented by supporting the lower face on a rotor of the motor projecting through the spindle insertion aperture 9, and the lateral displacement is restricted by the spindle 69 projecting through the hole 7, so that the disc 2 is maintained in a definite position with respect to the cartridge 1.

The hard jacket 3, as assembled, has a recess 11 for slideably connecting a shutter having generally a U-shaped cross-section. The recess 11 is provided with guide means cooperated with guide pins projecting from the shutter for allowing lateral movement of the shutter. In this embodiment, the guide means include a rear ridge 12a extending laterally over substantially a whole width of the hard jacket 3, along its rear peripheral edge, and first and second front ridges 12b and 12c, splitted by a rectangular aperture 13 for disposing the recording/reproducing area 8 of the disc 2, which extend substantially parallel to the rear ridge 12a along the front peripheral edge of the hard jacket 3. These ridges 12a, 12b and 12c are all adapted to be come into sliding contact with the inner face of the shutter. A reference numeral 14 shows a label adhered to the shutter face for use in representing the recorded subjects, for example.

The cartridge 1 used in this embodiment is, as usual, equipped with write protection means 15 for preventing the recorded information from accidental or erroneous erasure. The write protection means 15 includes a piece 17 slideably received in a slot 16 formed on the upper face of the hard jacket 3. On the lower face of the hard jacket 3 is formed a write protection hole 18 which is positioned between a light emitting element and a light receiving element (both not shown) mounted in the apparatus when the cartridge 1 is in the loaded position. When the operating piece 17 is positioned as shown in FIG. 1, the hole 18 is closed thereby so as to interfere with light transmission between the elements, in which case the disc 2 is ready for normal recording operation. If, in turn, the piece 17 is manually shifted down from the position shown in FIG. 1 to open the hole 18, which enables the light emitting from the first element to reach the second element, no fresh information can be recorded on the upper side of the disc 2. A similar write protection means is provided for the opposite, lower side of the disc 2, which includes a write protection hole 19 (FIG. 1). Further detailed description of the write protection means 15 is omitted since this arrangement is conventional and does not concern the material features of this invention. A reference square hole 20 is formed on opposite sides of the cartridge 1, which is used to maintain the cartridge 1 in the loaded position in a manner described later.

The cartridge 1 is of reversible type and therefore fundamental arrangements on the lower face of the hard jacket 3 will be the same as on the upper face described before. Similar and corresponding members and elements on the lower face are accompanied by the same numeral numbers. However, the shutter guide means 12 is slightly different on the upper and lower faces. More particularly, the shutter guide means 12 provided on the lower face comprises a rear ridge 12d extending laterally with respect to the cartridge loading direction along the rear edge and adapted to be in sliding contact with the inner face of the shutter, guide grooves 12e and 12f extending parallel to the rear ridge 12d along the front peripheral edge and adapted to receive guide pins (described later) projecting from the inner face of the shutter, and first and second ridges 12g and 12h, aligned with each other and extending along the front edges of the guide grooves 12e and 12f respectively, adapted to be in sliding contact with the inner face of the shutter.

Figure 2:
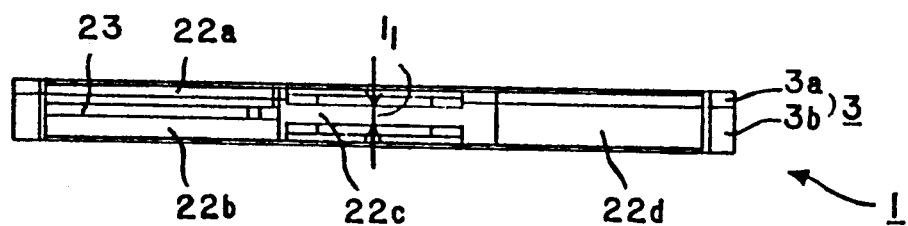
Figure 3:
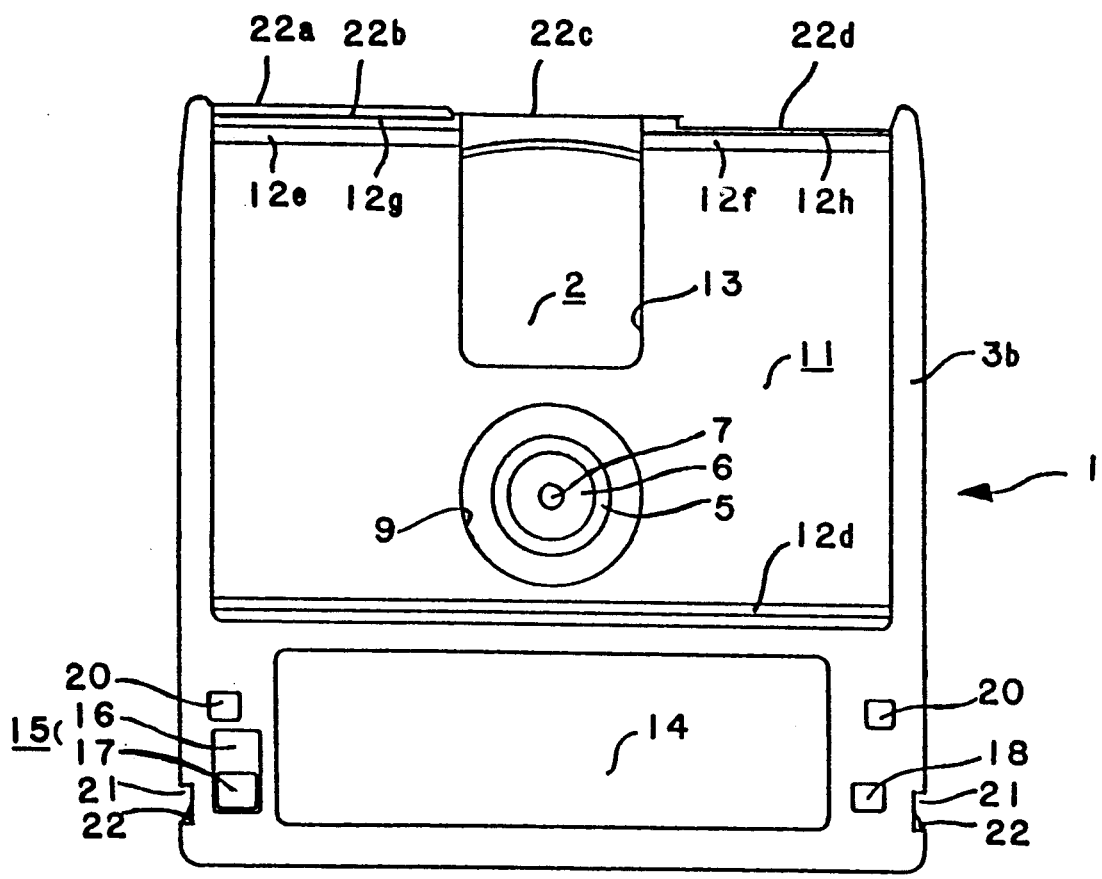
Figure 10:
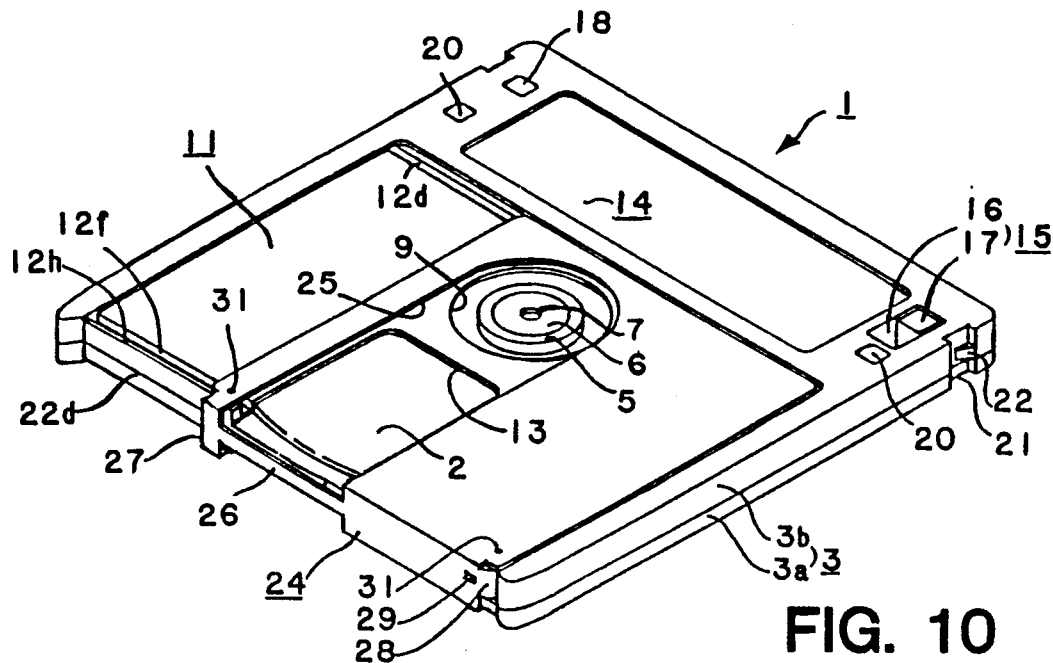
FIG. 10 is an oblique view showing construction and arrangements on the front and bottom of the disc cartridge which is equipped with the shutter in its opened position.
Figure 4:
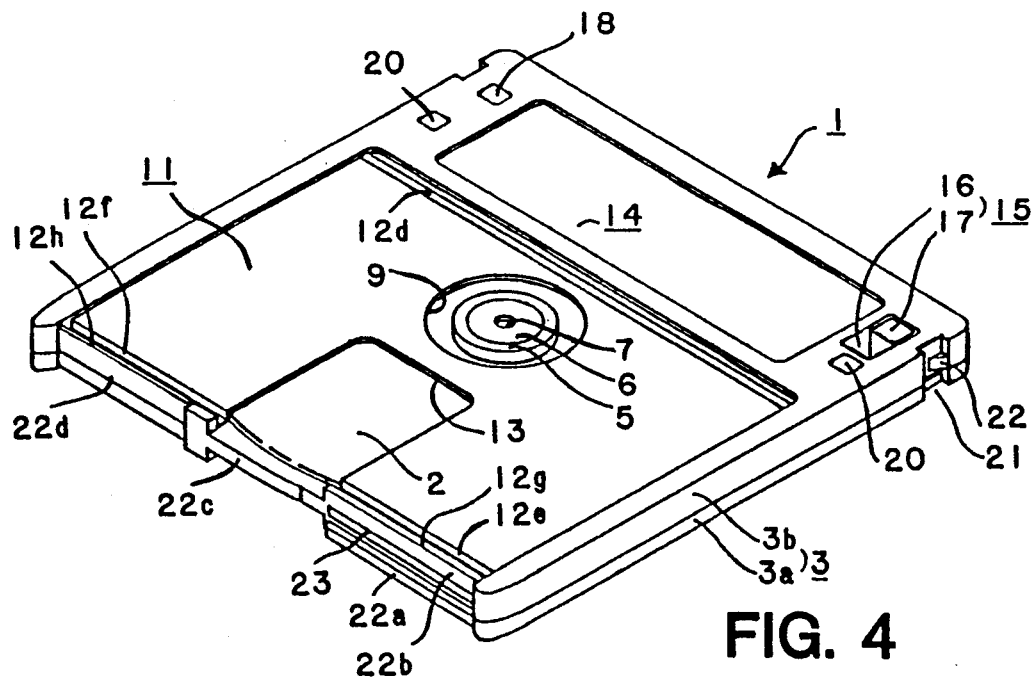
FIG. 4 is an oblique view showing construction and arrangements on the front and bottom of the disc cartridge, from which the shutter is also detached.

Near the rear peripheral edge of the cartridge 1 there are formed notches 21 on both sides, which include inwardly inclined faces 22. As best shown in FIG. 2, the front edge of the cartridge 1 has plural face at different levels. More particularly, there are a first face 22a extending along the front edge of the ridge 12b formed on the upper face of the cartridge 1, a second face 22b, extending parallel to the first face 22a across a groove 23, a narrow, central third face 22c, and a fourth face 22d, the lowest one, connecting the ridges 12c and 12h. The level difference between the first and second faces 22a and 22b will provide a passage of an inwardly directing curved portion 28 (FIG. 10) of the shutter during the lateral sliding movement. The groove 23 is formed for passing a spring 30 (FIG. 5) therebetween. While advancing cartridge 1 in the direction shown by the arrow A in FIG. 1, first face 22a is at any time positioned ahead of fourth face 22d, which is material for automatic shutter opening operation according to this invention, as described later in detail. The width ($l_1$) of third face 22c is coincident with the thickness ($l_2$) of disc 2 so that disc 2 can not be seen behind third face 22c in FIG. 2.

The shutter 24 of steel, aluminum, synthetic resin, etc. is slideably attached to the hard jacket 3 as shown in FIGS. 5 to 10. Shutter 24 has on both sides access windows 25. The front ends of access windows 25 are connected by a narrow neck 26, which is an integral part of the front edge of the shutter 24. The width ($l_3$) of neck 26 is the same as the width ($l_1$) of face 22c and also as the thickness ($l_2$) of disc 2. At opposite sides of the front edge of the shutter 24 there are formed a cut-out notch 27 and curved portion 28, respectively.

Figure 5:
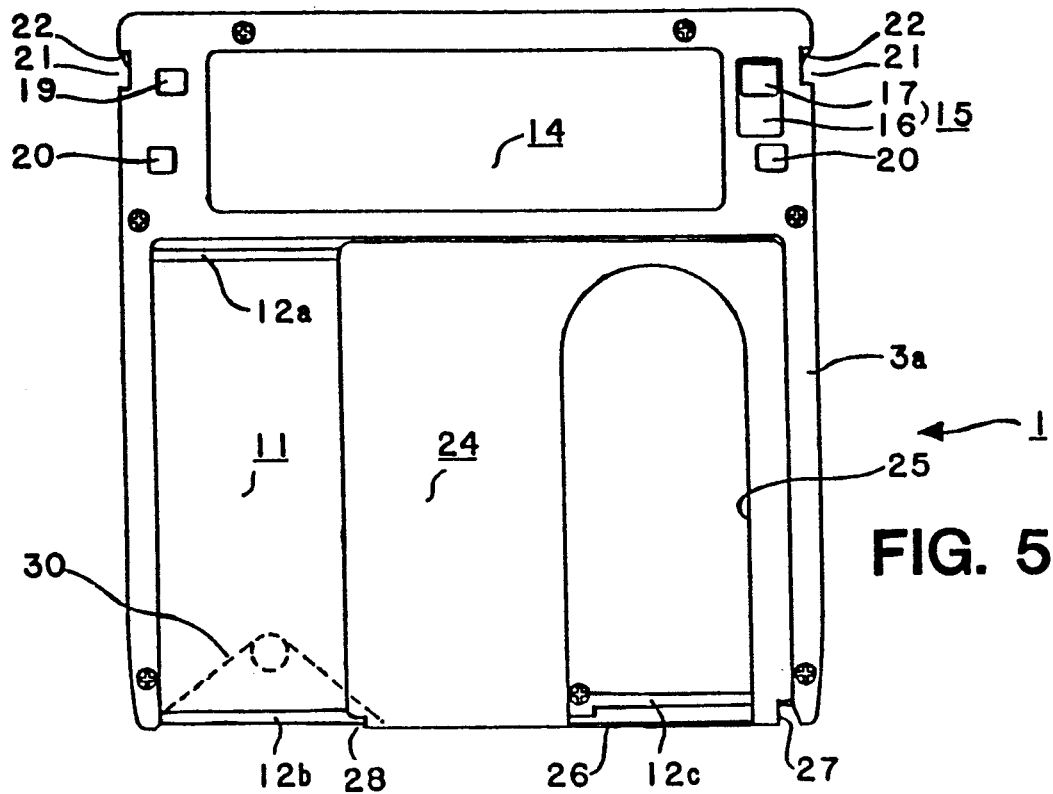
FIGS. 5 and 6 are top and front views respectively, showing the disc cartridge which is equipped with the shutter in its closed position.
Figure 6:
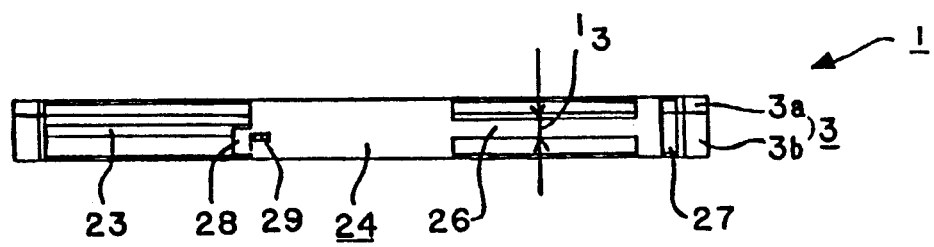
Figure 7:
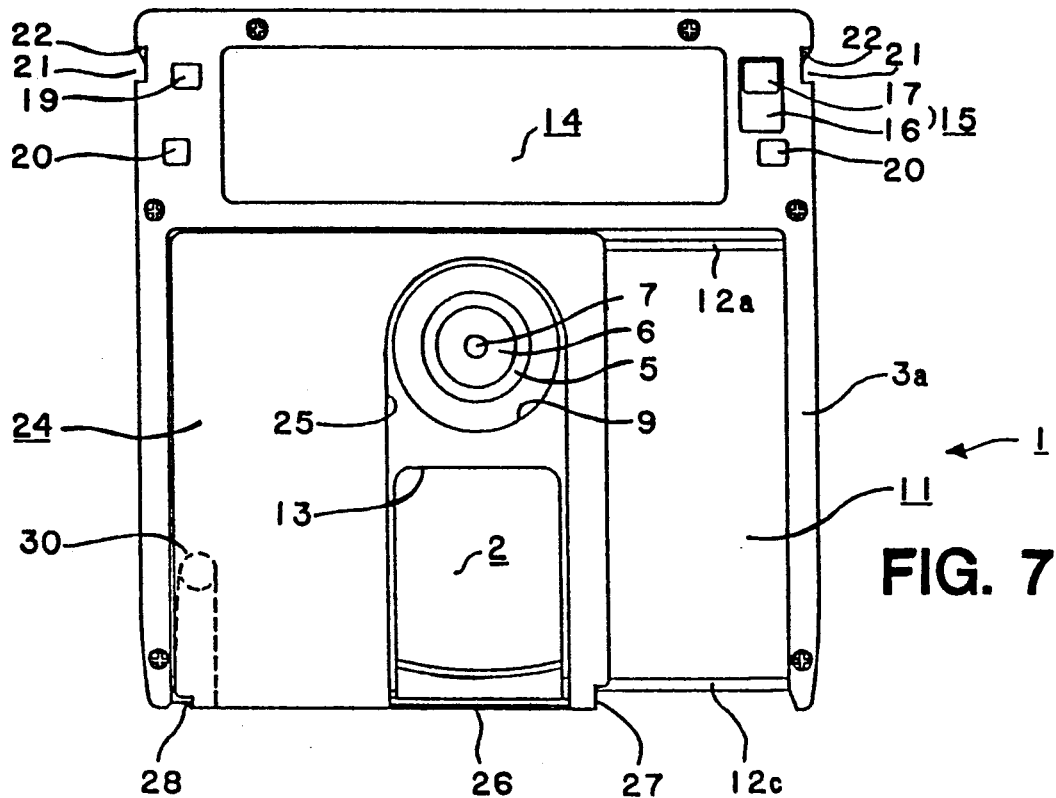
FIGS. 7, 8 and 9 are top, front and bottom views respectively, showing the disc cartridge which is equipped with the shutter in its opened position.
Figure 8:
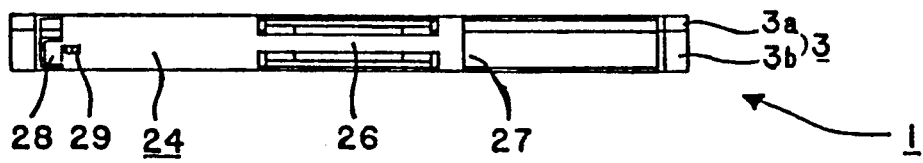
Figure 9:
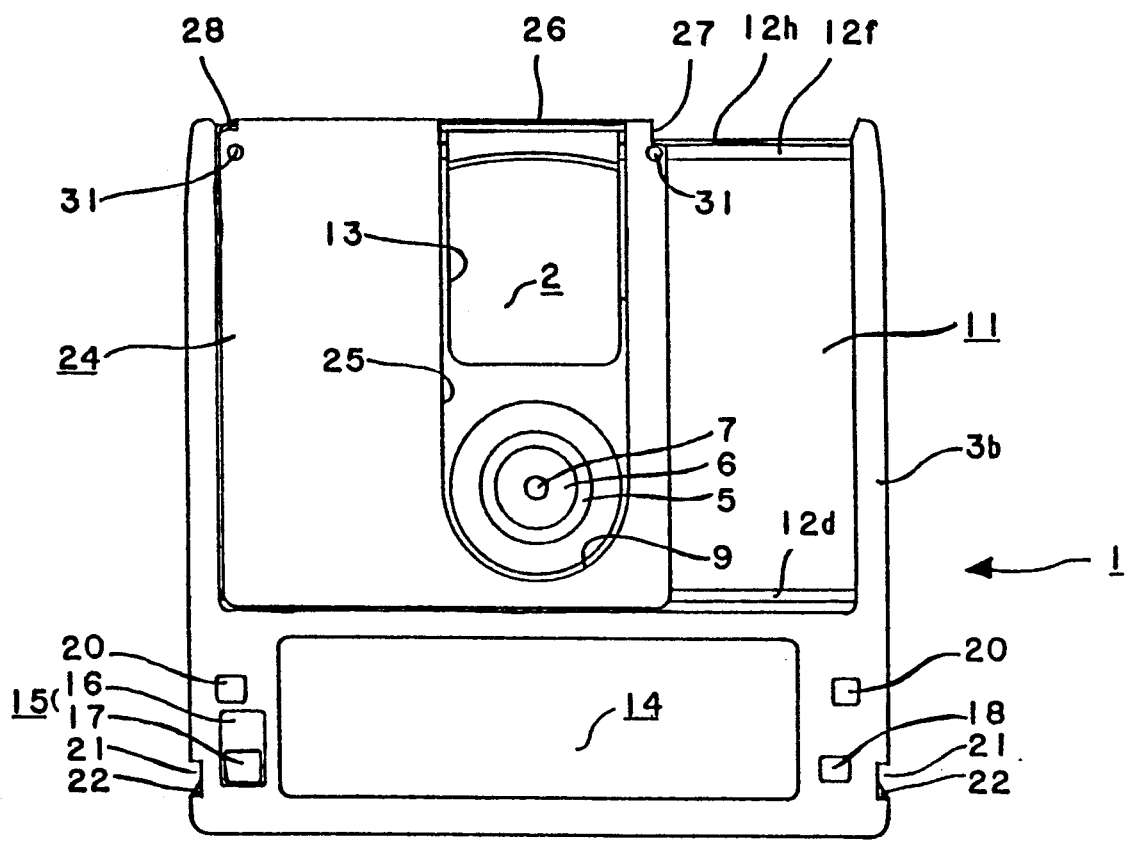

FIGS. 5 and 6 show the shutter 24 in its closing position. Spring 30 is connected between a fixed point on the extreme side of the front edge of hard jacket 3 and an inwardly projecting hook 29 and extends within groove 23, for biasing the shutter 24 toward the opposite side of the hard jacket 3 so that the shutter 24 is normally maintained in the closing position. With the shutter 24 in the closing position, the head window 13 is closed by the faces of shutter 24 for protecting the disc from accidental contamination and damage.

A pair of guide pins 31 (FIG. 9) projecting inwardly from the bottom of shutter 24 are fitted into guide grooves 12e and 12f respectively. With such guidance, by pulling the shutter 24 against the biasing force of spring 30, shutter 24 may be laterally slid from the closing position to another, opening position shown in FIGS. 7 to 10. In this opening position, guide pins 31 are positioned at extreme ends of guide grooves 12e and 12f respectively. With the cartridge 1 in the closing position, the spindle insertion aperture 9 and head window 13 formed on the hard jacket 3 are both completely opened via the access window 25 of shutter 24.

The recording/reproducing apparatus used in connection with the cartridge 1 as described above will now be described with reference to FIGS. 11 to 18. The apparatus embodying the invention is symmetric with respect to the center line extending in the cartridge loading direction. In the following description, in main, only one of symmetrically arranged members or elements will be described and only one side of the apparatus is shown in drawings.

Specifically referring to FIGS. 11 to 13, a main chassis 40 generally forms the outer panel of the apparatus. The rightmost (seen in FIGS. 11 and 12) ends of main chassis 40 extend upwardly to form inwardly projecting base mounts 41 to which required circuit plate (not shown) is secured. The open top of main chassis 40 is substantially covered by a holder bottom plate 42 (FIGS. 14 to 16) secured thereto. The center of holder bottom plate 42 is cut out to form a wide, U-shaped access window 43 enabling the optical head mechanism and spindle to have access to the disc 2 when the cartridge 1 is in the loaded position. The cut-out extends upwardly and turned as L-shaped to form a bias magnet attachment 44 to which a bias magnet 55 comprising a coil 54 coiled around an E-shaped core 53 is mounted as shown in FIG. 15. The bias magnet 55 will be opposed to the recording/reproducing area 8 of disc 2 to create a magnetic field, in the loaded position of cartridge 1.

The holder bottom plate 42 is provided symmetrically with respect to the center line extending in the cartridge loading direction with each one pair of first, second and third slots 45, 46 and 47. As best shown in FIG. 14, the first slot 45 extends straight along the peripheral edge of the holder bottom plate 42 from the leftmost end 45a to the right. The second slot 46 is formed inside of the first slot 45 and includes a rectilinear portion 48 extending substantially parallel to the first slot 45 between the rightmost end 48a and the leftmost end 48b and a crescent-shaped portion 49 formed integral with the rectilinear portion 48. The crescent-shaped portion 49 is formed by an arcuate edge 49a an da first and second bowstring-shaped edges 49b and 49c connected by a step 49d. The center of arc 49a will be a pivot pin 114 when a sliding member 113 is positioned in the leftmost end 45a, and the radius of arc 49a will substantially correspond to the distance between pins 114 and 117 of an arm 115 which will be described later in detail. The third slot 47 is formed between the first and second slots 45 and 46 and includes a straight portion 47a extending in the cartridge loading direction and an enlarged portion 47b formed integral with the leftmost end of the rectilinear portion 47a.

The side peripheries of the holder bottom plate 42 are bent upwardly and then inwardly to form integrally side walls 50 and top flanges 51. Thus, a cartridge holder is constituted by the holder bottom plate 42, side walls 50 and top flanges 51 to provide a cartridge inserting/discharging port 52 as well as a space for receiving and supporting the cartridge. To the side wall 50 is attached inside an attachment plate 50a made of synthetic resin, for example, for smoothening insertion and discharge of cartridge 1.

With the apparatus described, when cartridge 1 is completely received within the holder to occupy the loaded position, at the same time or immediately thereafter, drive mechanism retractably mounted within the apparatus is shifted from the lower, stand-by position to the upper, operative position wherein necessary positional relationship is achieved with respect to the loaded cartridge 1 or disc 2. Specifically referring again to FIGS. 11 to 13, a base 58 is formed integrally by a center plate 58a to which the drive mechanism including a motor 56 and an optical head mechanism (FIGS. 17 and 18) is secured, side plates 58b standing from the side peripheries of center plate 58a, and flanges 58c extending outwardly from the top portions of side panels 58b. Between the rear-end portions of side panels 58b and main frame 40 are connected via pivots 59 which allows the base 58 to be pivoted between the stand-by position and the operative position. FIGS. 11 to 13, 17 and 18 show the base 58 in the operative position in which the upper face of the base mount 58a will be level and therefore a spindle 69 of motor 56 is set upright, just across the cartridge 1 in the loaded position.

On the flange 58c of base 58 there is formed means for maintaining the cartridge 1 in the loaded position. This positioning means comprises a pair of first reference pins 60 planted on flange 58c at substantially a center thereof, a pair of second reference pins 61 near the cartridge inserting/discharging port 52 and a pair of leaf springs 70 (FIG. 15) installed on the holder top plates 51. The first reference pins 60 are adapted to mount thereon the leading end portion of cartridge 1 in the loaded position, which is cooperated with the leaf springs 70 provided for exerting a downward pressure, through openings 51a, onto the cartridge, to restrict vertical displacement or movement of the cartridge. Second reference pins 61 are adapted to be received within the corresponding reference holes 20 of cartridge 1 for preventing lateral displacement or movement of the cartridge. Second reference pins are quipped with elastomeric O-ring 62 whereupon the holder bottom plate 42 will lay down.

The spindle motor 56 is, for example, a three-phase motor consisting of six coils 63 and a magnet $64_1$ polarized in eight sections. The coils 63 is coiled around a base portion 66 on a substrate 65. The magnet $64_1$ is secured to the underside of a rotor 67 which is rotatable together with spindle 69 penetrating through the base portion 66 via bearing means 68.

Besides the positioning of cartridge 1 in the loaded position which is achieved by means of reference pins 60 and 61 and leaf springs 70, definite positioning of disc 2 within the cartridge 1 should also be contemplated as it is received in the cartridge with some looseness both in vertical and lateral directions. In this embodiment, vertical displacement or movement of disc 2 is prevented in such manner that the top of rotor 67 is fitted into the spindle insertion aperture 9 to come into contact with the lower face of disc 2, and lateral positioning of centering of disc within the loaded cartridge is established by the spindle 69 penetrating through the hole 7 of disc 2. In the loaded position of cartridge 1, there will be provided a tendency that a magnet $64_2$ secured to rotor 67 attracts the magnetic center plate 6 of disc 2. The spindle motor 56 used in this embodiment is of conventional flat type and can therefore be replaced by another suitable one.

Figure 17:
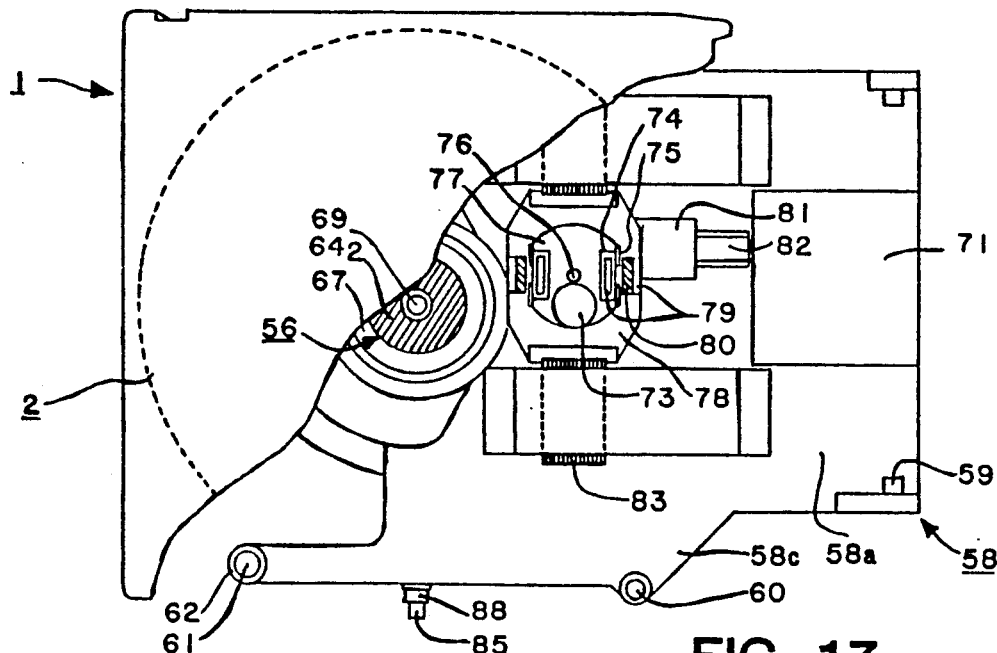
FIGS. 17 and 18 are a top view and a side view partly in section respectively, showing the base plate and a motor and an optical head mechanism mounted thereon together with the disc cartridge in the full-loaded position.

As best shown in FIGS. 17 and 18, the optical head mechanism has an optical source 71 including as known a laser diode, a polarizer plate, a beam splitter, etc. from which a laser beam is projected to a reflective mirror (not shown) in the cartridge loading direction, when the base plate 58 is in the operative position. The reflection is directed upright toward an object lens 73 so that a spot of the laser beam is concentrated to the recording/reproducing area 8 of disc 2 in the loaded cartridge 1. The objective lens 73, as well as a focussing coil 74 and a tracking coil 75, are secured to a support 77 which is rotatable about a vertical shaft 76 and vertically slideable along the shaft 76. Above the base plate 58 there is attached an optical head base 78 for mounting thereon yokes 79 and a magnet 80, which constitute a magnetic circuit both for focussing and tracking operation. A linear guide 81 is secured to the optical head base 78 and adapted to be in engagement within a guide rail 82 attached to the base plate 58. By means of a linear motor having a coil 83 and a magnet 84, the linear guide 81 is driven in the cartridge loading direction along the guide rail 82 to actuate the optical head base 78 theretogether.

Again reference should be made to FIGS. 11 to 13. Between a pin 85 protruding outwardly from the flange 58c of the base plate 58 and an engaging nail 86 formed at opposite sides of the basement of main chassis 40 is connected a spring 87 to normally bias the base plate 58 to rotate in the clockwise direction as viewed in FIG. 12. The pin 85 is equipped with a freely rotatably guide roller 88 which has a material meaning in the movement of a sliding plate.

A sliding plate 89 is integrally formed by a bottom 89a, an ejecting button 89b extending from the fore end of the bottom 89a, at least a part thereof being always protruded to the outside through an aperture (not shown) formed in the front panel of main chassis 40, and a pair of side walls 89c extending upwardly from the side edges of the bottom 89a. Slots 91 are formed in the bottom 89a for slideably receiving pins 90 planted on the bottom of main chassis 40, and slots 93 are formed in the side walls 89c for slideably accomodating pins 92 projecting inwardly from the side walls of main chassis 40. A pair of the bottom 89a is cut out to form a projection 94 for engaging one end of a spring 95 having the other end connected to the pin 90, so that the sliding plate 89 is normally biased to move toward the ejection, namely to the left in FIGS. 11 and 12. The sliding plate 89 is slideable in the cartridge loading/ejecting direction under guidance of pins 90 and 92 engaged within slots 91 and 93, respectively.

Figures 19, 20:
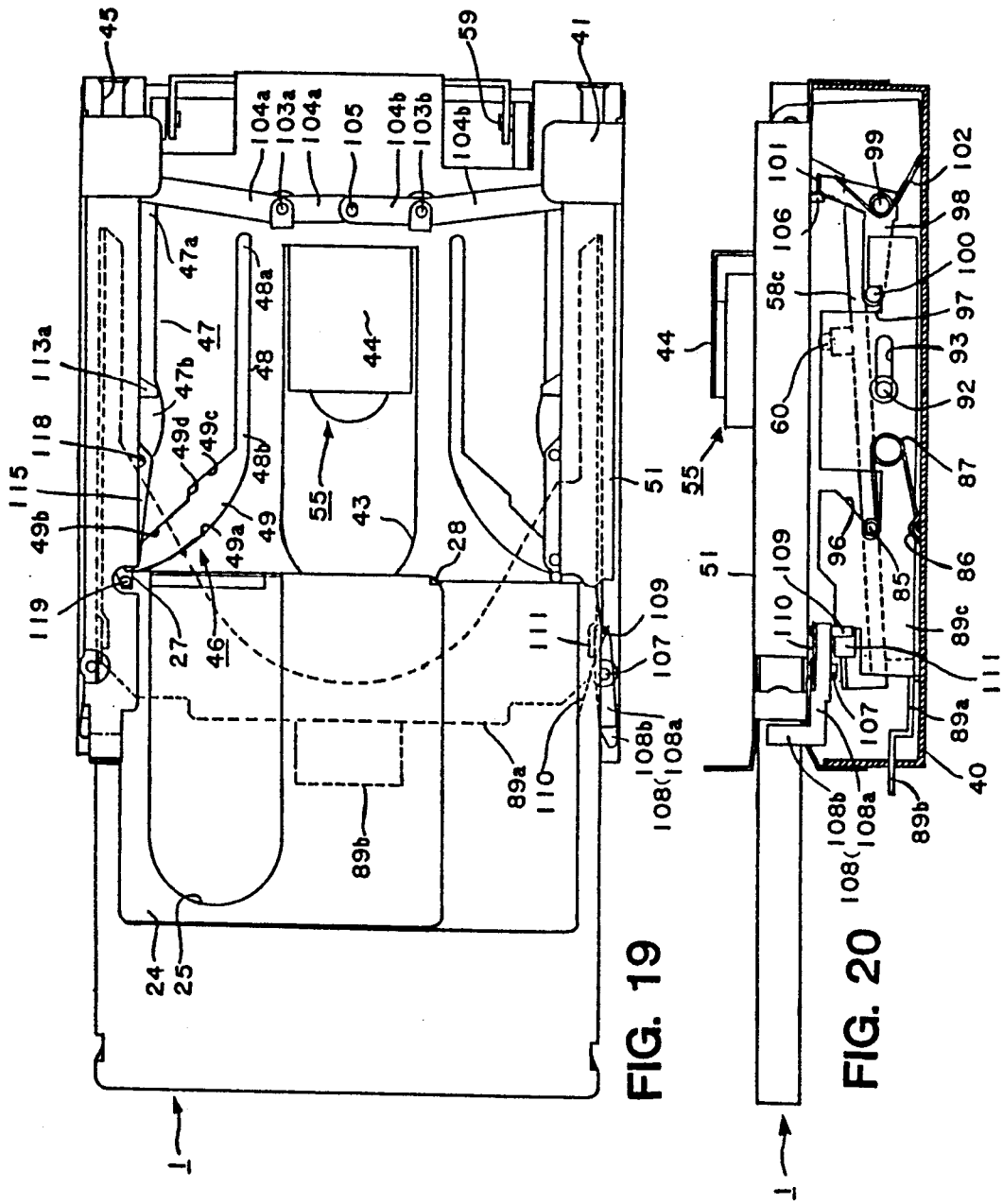
Figure 24:
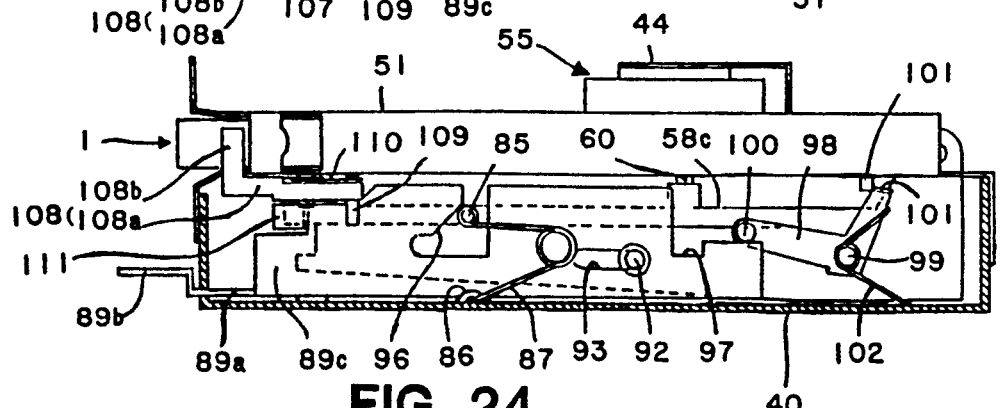
Figure 25:
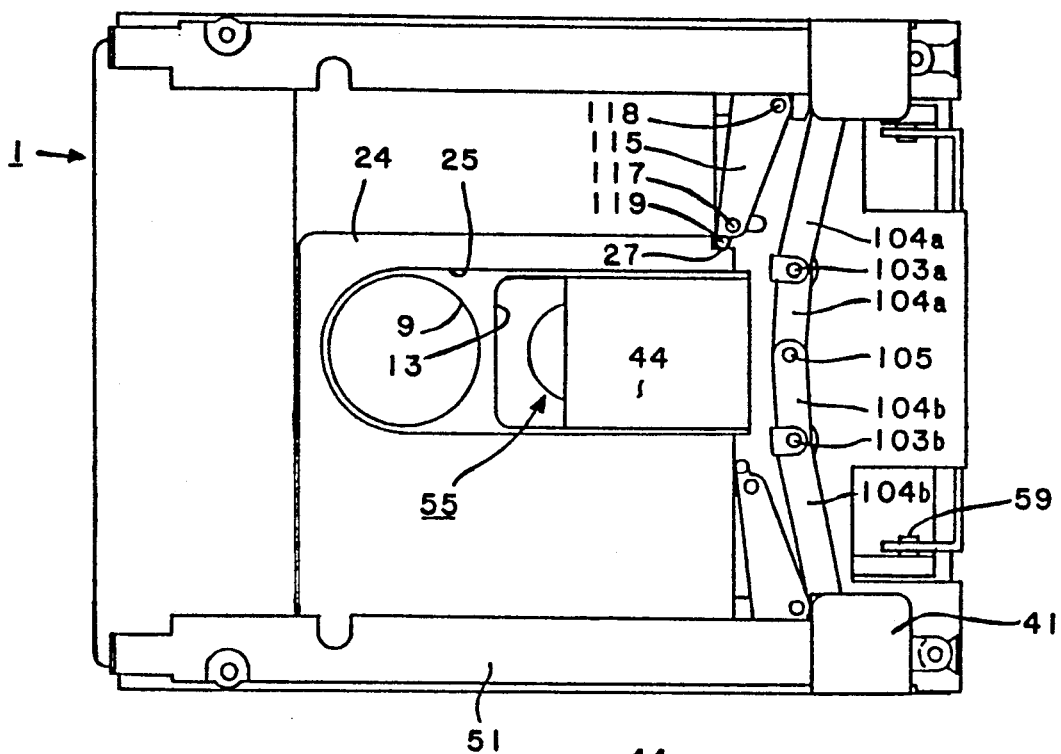
Figure 26:
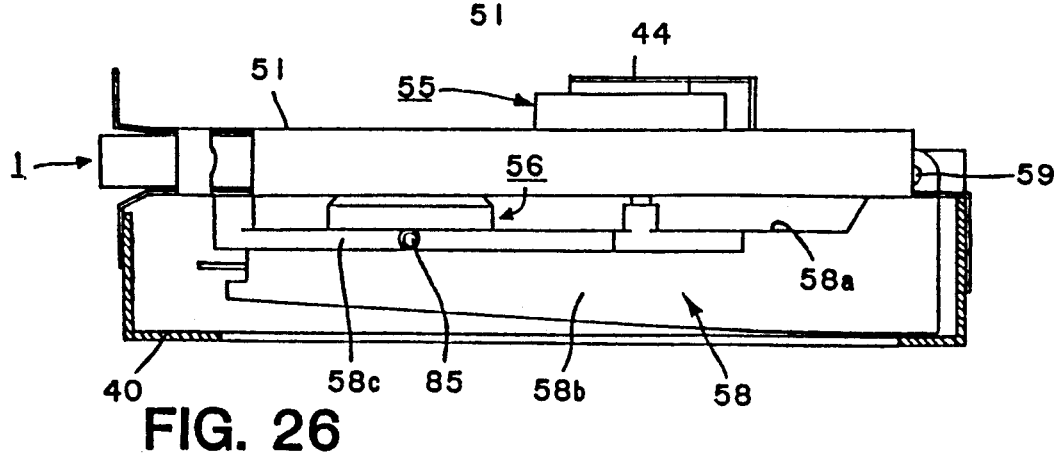

A middle portion of the side wall 89c of sliding plate 89 is cut out as substantially triangular-shape to form a slot 96 (FIGS. 20 and 24) for guiding the guide roller 88 rotatably provided around pin 85 of base plate flange 58c along with movement of the sliding plate 89, whereby the base plate 58 can be shifted between the standby position and the operative position. Near the rear end of the slot 96 is formed a vertical cut-out 97 adapted to engage one end of a sliding plate locking arm (FIG. 20).

The sliding plate locking arm 98 is substantially L-shaped and supported rotatably about a pin 99 secured inwardly to the side wall of main chassis 40. The locking arm 98 has at its one end an outwardly projecting pin 100 engageable with the cut-out 97, and the other inwardly directing extension 101. The arm 98 is normally biased to rotate in the counter clockwise direction (as viewed in FIG. 12) by means of a spring 102 coiled around the pin 99.

Specifically referring to FIGS. 14 to 16, behind the access window 43 formed on the holder bottom plate 42, there are planted a pair of pins 103a and 103b and a pair of link arms 104a and 104b rotatable about the pins 103a and 103b, respectively. The inner ends of the link arms 104a and 104b are rotatably connected to an interlocking pin 105, which is connected or secured to nothing but these arms, so that these arms will be moved in complete unison with each other. More particularly, supposing one of the arms 104a is rotated about the pivot 103a in some degree of rotational angle, the other arm 104b is followed to rotate about the pivot 103b in the opposite direction in the same degree. To the outer end of each arm is secured a push pin 106 extending downwardly below the holder bottom plate 42 through the third slot 47 to be engageable with the extension 101 of sliding plate locking arm 98.

Figure 23:
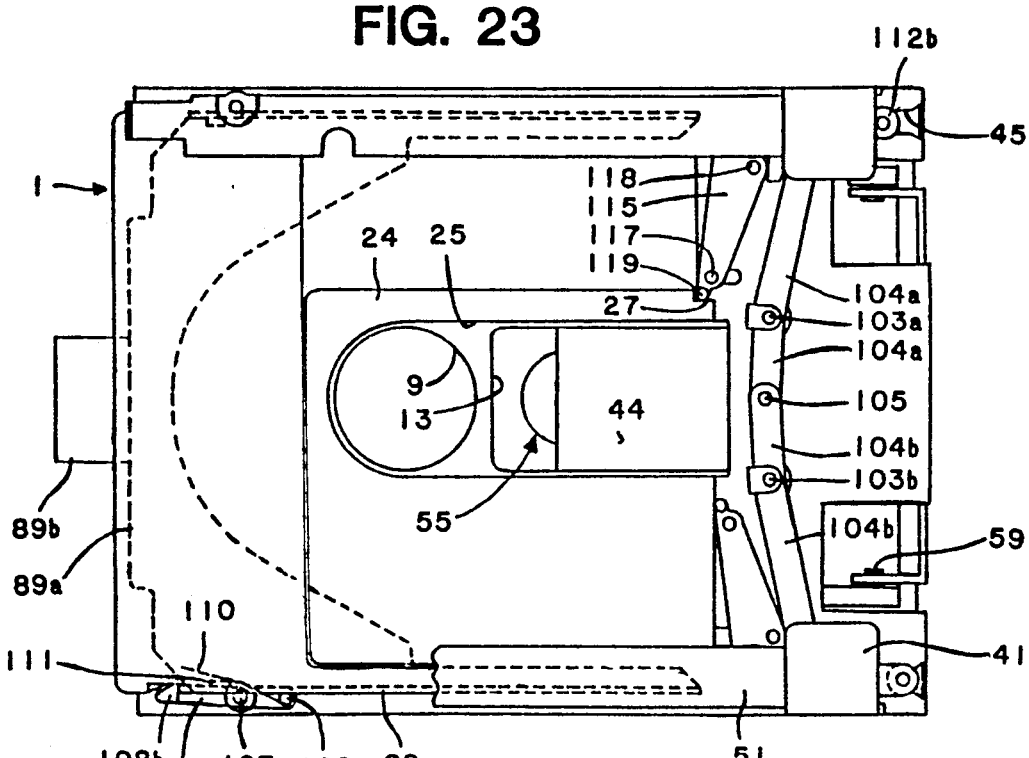
FIGS. 23 through 26 illustrates the apparatus in the cartridge full-loaded condition, as in the same manner in FIGS. 19 through 22.

Means for locking the cartridge 1 is also provided. A lever 108 operated for this purpose is rotatably supported by a pivot axis 107 projecting down from the holder bottom plate 42 near the cartridge inserting/discharging port 52. The locking lever 108 has a rod-like portion 108a mounted beneath the holder bottom plate 42, the leading end of which extends upwardly to form a projection 108b adapted to enter the cartridge receiving space encircled by the holder. The projection 108b will come into engagement with the notch 21 formed on the side of cartridge 1 so as to maintain cartridge 1 in the loaded position. To the rear end of the rod-like portion 108a is press-fit a downwardly projecting pin 109. A spring 110 is connected between the pin 109 and a projection formed on the holder bottom plate 42 and coiled around the pivot 107, thereby normally biasing the locking lever 108 to rotate in the counter clockwise direction as seen in FIGS. 19 and 23. When cartridge 1 is carried in the loaded position, at which time the base plate 58 is maintained in the operative position with the sliding plate 89 being set free from the locking mechanism, as particularly shown in FIG. 23, the pin 109 is in contact with the outer face of the side wall 89c of sliding plate 89, causing the locking lever 108 to rotated in the clockwise direction against the biasing force of spring 110 so that the projection 108b is brought into engagement with the notch 21 for maintaining the loaded position of cartridge 1. When, in turn, cartridge 1 leaves out of the loaded position and thus the base plate 58 is shifted down to the stand-by position with the sliding plate 59 being locked, as shown in FIG. 19, the sliding plate 89 has been shifted to the right further from the position of FIG. 23, the pin 109 is now in contact with the face 111 (FIG. 19) extending inward of the side wall 89c, whereby the lever 108 is slightly rotated in the counter clockwise direction to release the engagement between the projection 108b and notch 21. During ejecting or discharging operation of cartridge 1, the locking lever 108 is retracted for ensuring smooth movement of cartridge 1.

Shutter opening mechanism which concerns the subject matter of the present invention will now be described with reference to FIGS. 14 to 16. In these drawings, the shutter opening mechanism is shown as the cartridge 1 having been carried into the loaded position, through cartridge itself is not shown. This mechanism includes a sliding member 113 having a pair of rotatable guide rollers 112a and 112b which are adapted to fit into the first slot 45 formed on the holder bottom plate 42 to make the sliding member 113 slideable therealong. The sliding member 113 is equipped with a supplemental guide roller 116 between the guide rollers 112a and 112b, which will provide resilient contact with the inner wall of the holder side wall 50 for smoothening the sliding movement. To the leading end of the sliding member 113 is pres fit a pin 114. The sliding member 113 has an inwardly extending flap 113a adapted to be in sliding contact with the apex of the arm 115.

In the shutter opening mechanism there is also mounted a triangular arm 115 having one apex pivoted to the pin 114. The other two apexes of arm 115 has downwardly projecting pins 117 and 118 adapted to be fitted into the second slot 46 and third slot 47 of the holder bottom plate 42, respectively. The apex including the pin 118 is engageable with the extended flap 113a to restrict the rotation of arm 115. The apex including the pin 117 is integrally formed with a pin 119. The arm 115 is normally biased to move toward the ejection by means of a spring 120 having one end connected to the pin 118 and the other end supported by a projection formed at the fore edge of the holder bottom plate 42.

Now, explanation will be given about the operation of the apparatus having the aforesaid construction.

FIGS. 19 to 24 show the condition created by inserting the leading portion of cartridge 1 into the cartridge receiving space through the port 52 until the notch 27 comes into engagement with the pin 119 planted on the one extreme end of the arm 115. In this condition, the apparatus will be defined as in an "ejected position". In this ejected position, as particularly seen from FIGS. 19 and 20, the cartridge locking lever 108 remains in its retracted position in which the pin 109 is received in the recess 111 to retreat the projection 108 from the cartridge, so that the cartridge loading operation will not be interfered. The base plate 58 is in the stand-by position, namely the drive mechanism including motor 56 and optical head mechanism 57 is in whole retracted below the holder bottom plate 42, having no part protruding onto the cartridge receiving space. The pin 100 of the sliding plate locking arm 98 is fitted into the recess 97 so that the sliding plate 89 is retained in a locked fashion in the rightmost position, against the spring 95. The pin 85 outwardly projecting from the flange 58c is received deep in the corner of the guide slot 96. The push pin 106 of the link arm 104 is in touch with the end 101 of arm 98.

When cartridge 1 is advanced from the ejected position, through a "half-loaded position" to be described later, a "full-loaded position" will be attained as shown in FIGS. 23 to 26. The apparatus is ready for expected recording and/or reproducing operation in this full-loaded condition.

Along with the cartridge loading operation, the shutter opening arm 115 is first operated to open the shutter 24. More particularly, when cartridge 1 is completely loaded into the holder to be installed in the loaded position, one of the arm 115, the lower one in FIG. 23, is operated to move forward due to contact with the leading face of cartridge 1, whereby the arm 104b is rotated in the counter clockwise direction, which causes at the same time the other arm 104a to rotate in the opposite direction. As a result, by virtue of contact between the pin 106 of arm 104b (104a) and the extension 101 of the sliding plate locking arm 98, arm 98 is rotated in the clockwise direction to release the locking condition of sliding plate 89, which will then start moving to the left by means of spring 95. Along with the sliding movement of the plate 89, at first, the cartridge locking lever 108 is rotated in the clockwise direction (in FIG. 23) to maintain the cartridge in the loaded position through engagement between the projection 108b and the notch 21. Then, the base plate 58 is rotated about the shaft 59 in the clockwise direction (in FIG. 24) and shifted from the retracted position to the upper operative position, while guiding the pin 85 along the inclined edge of the guide slot 96.

Such a series of operation, including shutter opening operation, cartridge locking operation and base plate shifting operation, will be described in detail with special reference to FIGS. 27 to 34.

Figure 27:
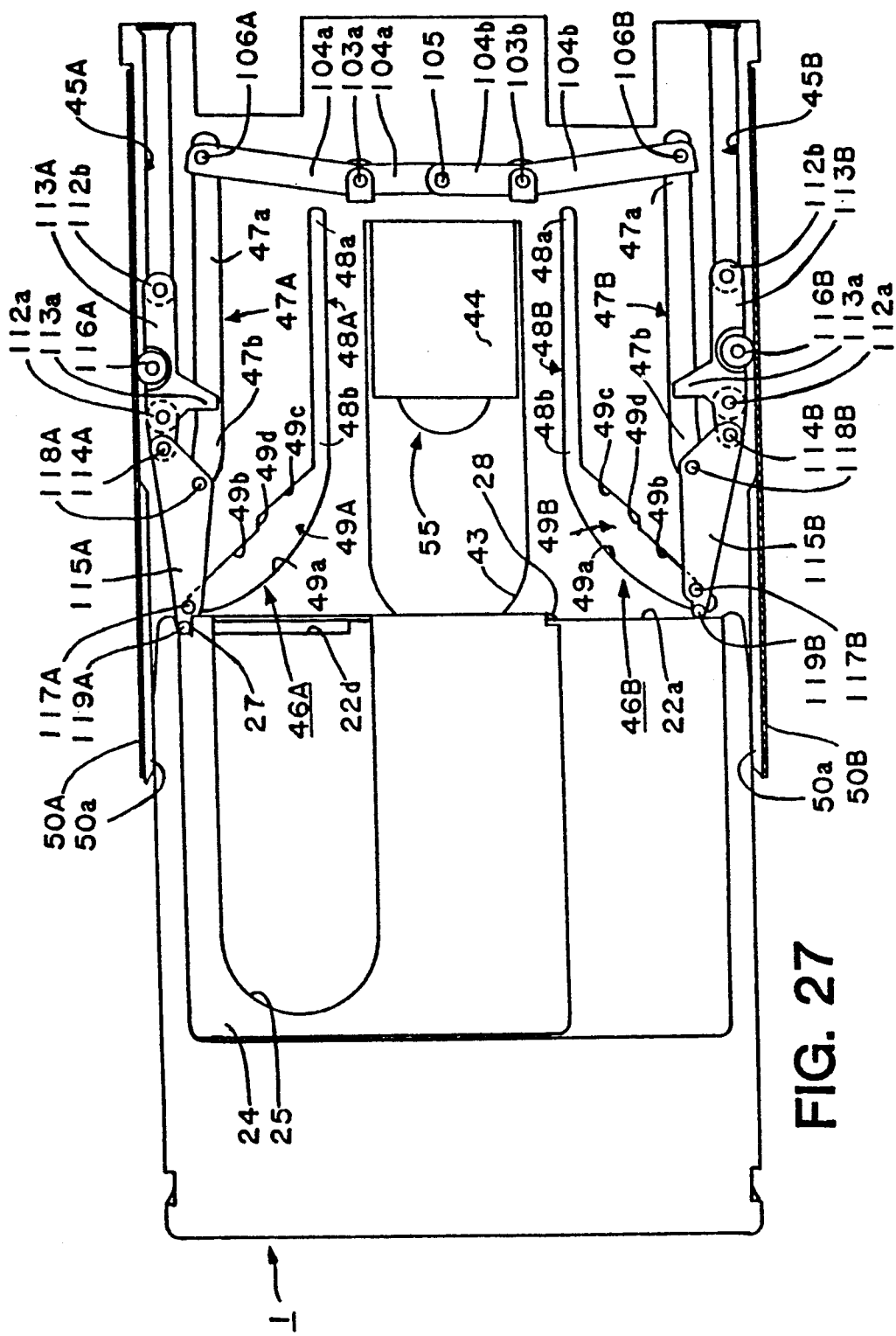
FIGS. 27 through 34 are top views showing step by step how the shutter actuating mechanism according to the invention is operated along with insertion of the disc cartridge into the apparatus.
Figure 28:
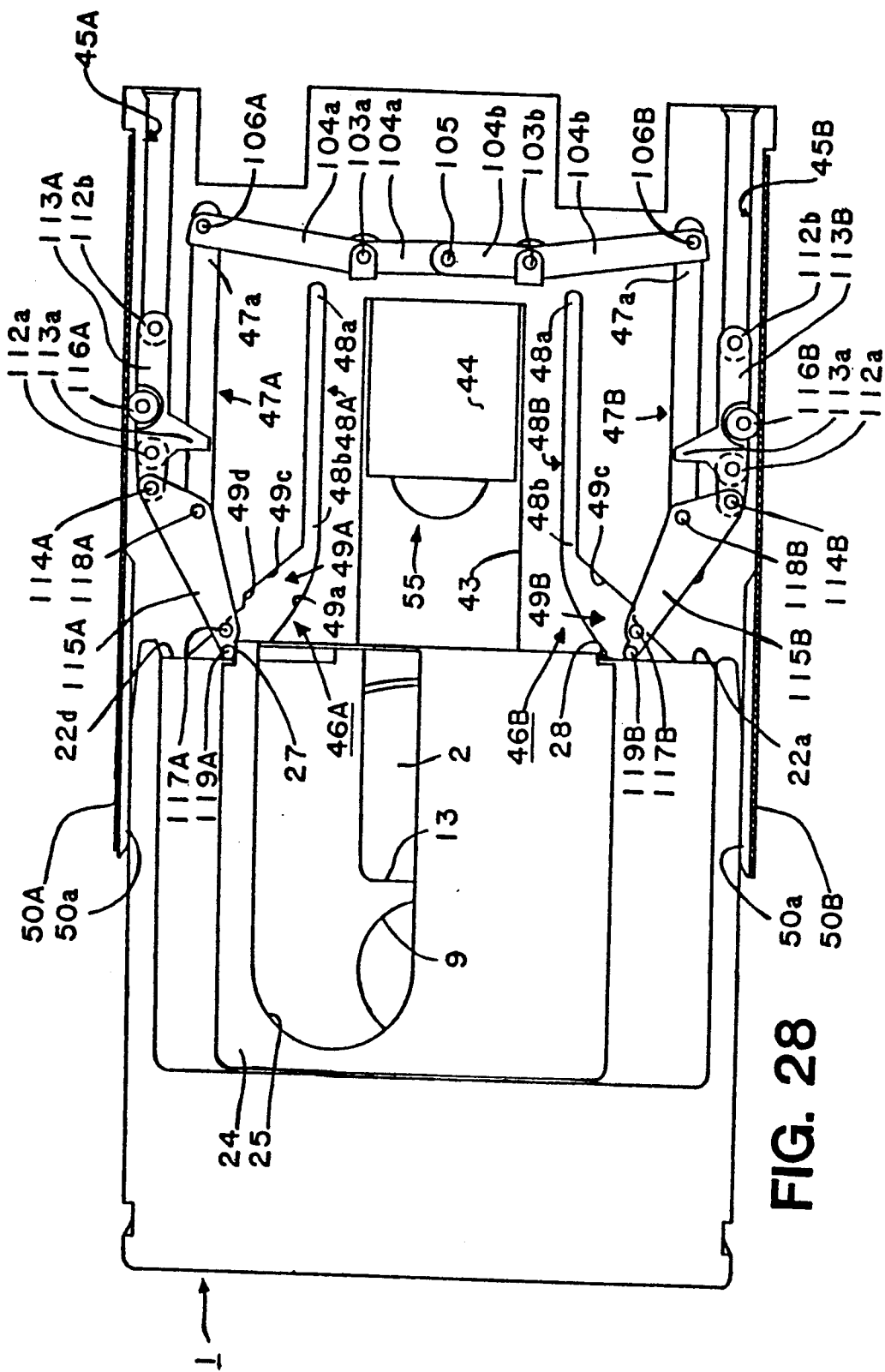

FIG. 27 illustrates the position of various components associated with the holder bottom plates 42 when the apparatus is in the ejected position shown in FIGS. 19 to 22. As having been described, the ejected position is created when the cartridge 1 is loaded so that the pin 119 (119A) planted on one end of the shutter opening arm 115 (115A) is brought into engagement with the notch 27 formed at one end of the front edge of cartridge 1. At this time, the arm 115A is drawn by the spring 120 toward the port 52, whereby the pin 117A remains in the leftmost end of the slot 46A and the pin 118A in the leftmost end of the enlarged portion 47b of the slot 47A. The sliding attachment 113A is also pulled toward the port 52 by the pin 114A so that the guide roller 112a is also positioned in the leftmost end 45a of the slot 45A. Here, it should be reminded that the fore edge of cartridge 1 has plural faces at difference levels in the cartridge loading direction and that the face 22d including the notch 27 is at any time somewhat behindhand of the face 22a. Accordingly, in the ejected position, the pin 119B of another arm 115B has been already pushed by the leading face 22a, and the pin 117B has been moved from the leftmost end of the slot 46B to the right and now is ashore on the first straight edge 49b. The pin 118B has been caused to move within the enlarged portion 47b of the slot 47B. In this connection, attention should be paid to the fact that while the shutter opening operation is governed by the first arm 115A, the position of the second arm 115B will be at any time moved ahead of the arm 115A due to contact with the leading face 22a of cartridge 1.

While cartridge 1 is further advanced from the ejected position of FIG. 27, arm 115A is being pivotted in the counter clockwise direction about the pin 114A. In this course of movement, the shutter 24 is caused to be laterally slid or opened through engagement between pin 119A and notch 27 of cartridge 1. Along with further advancement of the cartridge, the position shown in FIG. 28 and then in FIG. 29 will be obtained.

Figure 29:
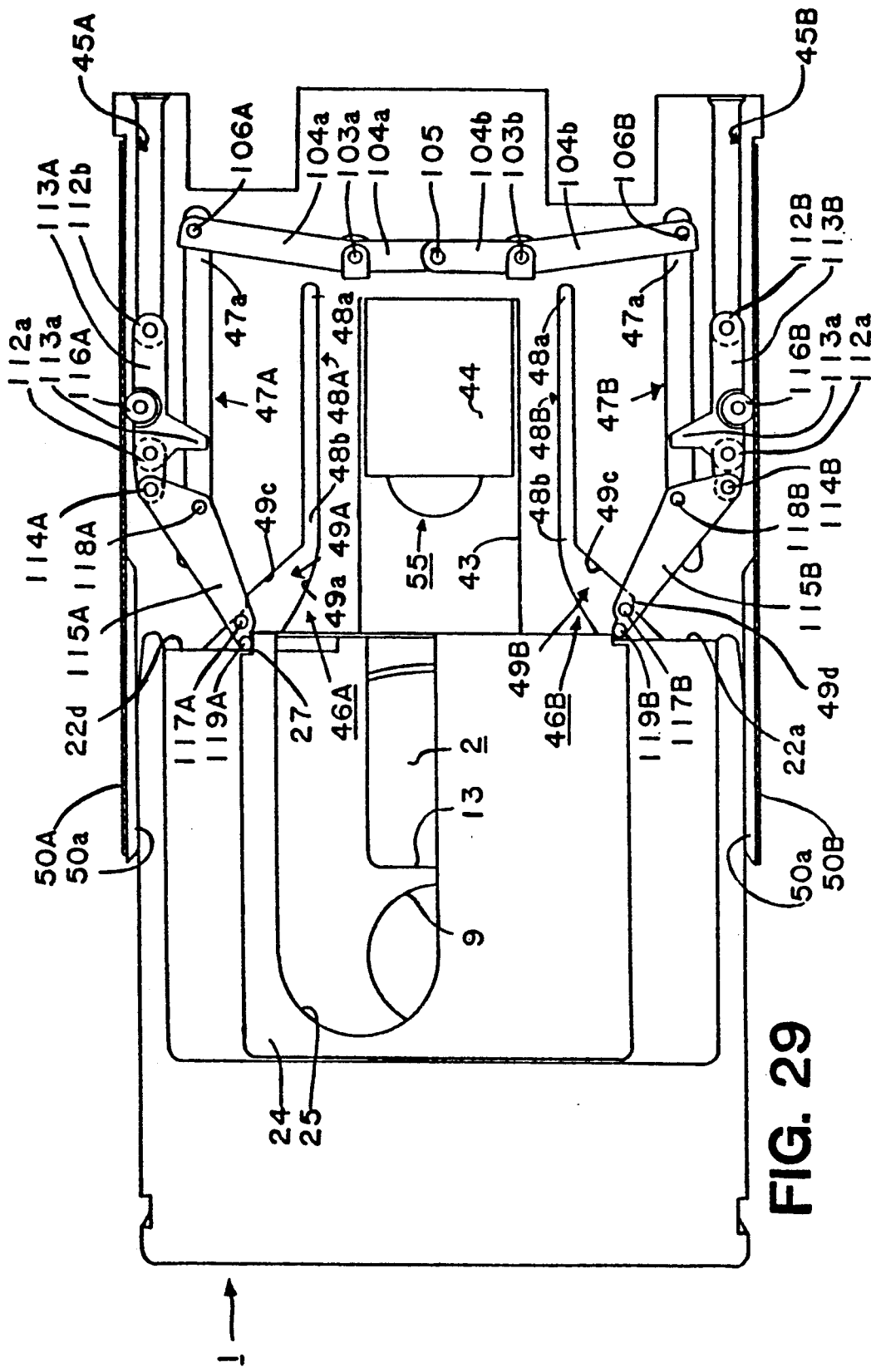

In FIG. 29, the pin 119B of the second arm 115B, which had been operated in contact with the leading face 22a of cartridge 1, has run on to the curved portion 28 of cartridge 1. At this time, the pin 117B of second arm 115B is just on the step 49d formed between the first and second bowstring-like extending edges 49b and 49c. The step 49d will provide for a retreat of the pin 117B, thereby ensuring smooth rotation of the arm 115B along with further advancement of cartridge 1, which otherwise might be stuck as the curved portion 28 is inclined substantially in parallel with the extending edge 49b. Thereafter, the pin 119B will run ashore on the front edge of the shutter 1 and then be running in contact therewith.

Figure 30:
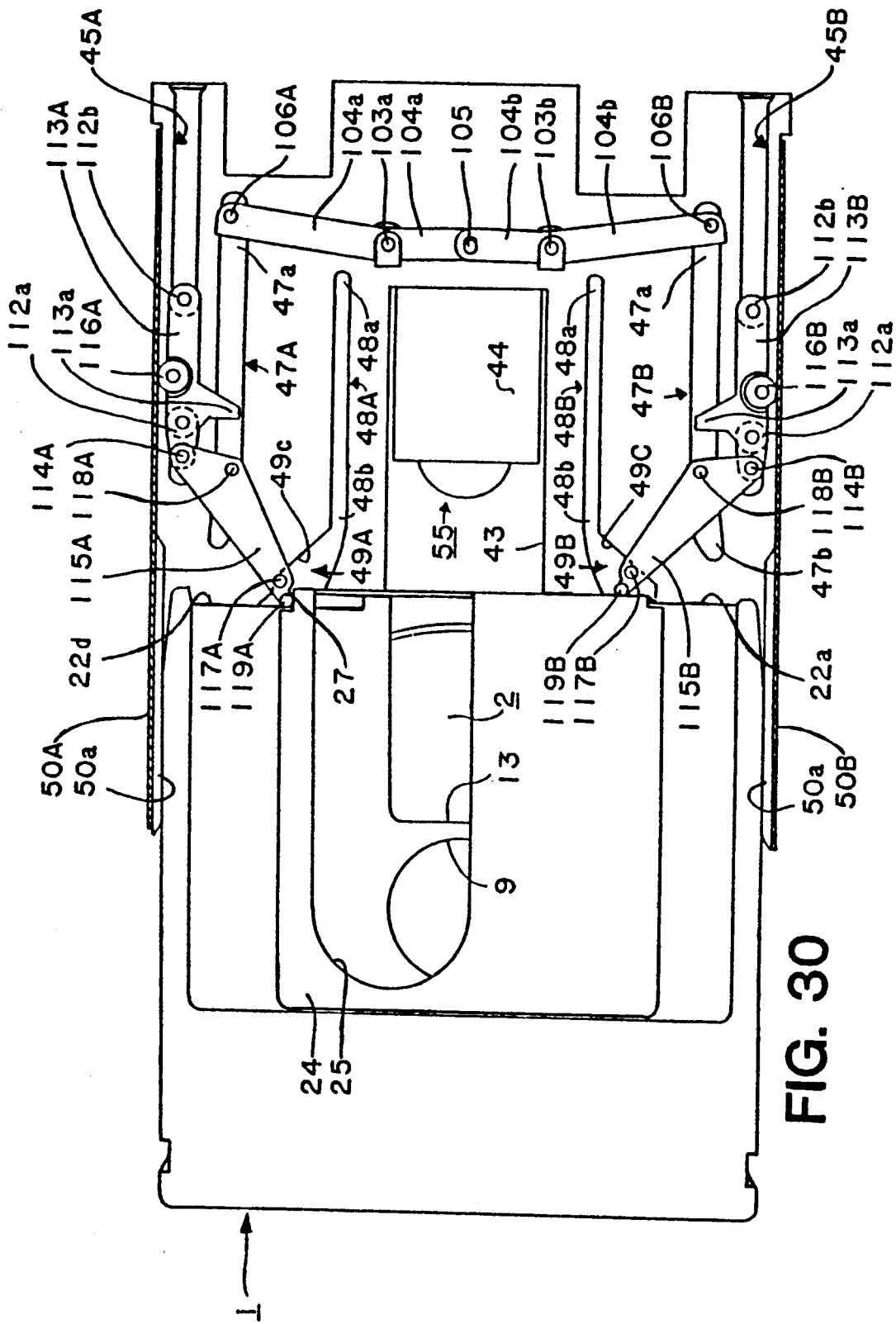
Figure 31:
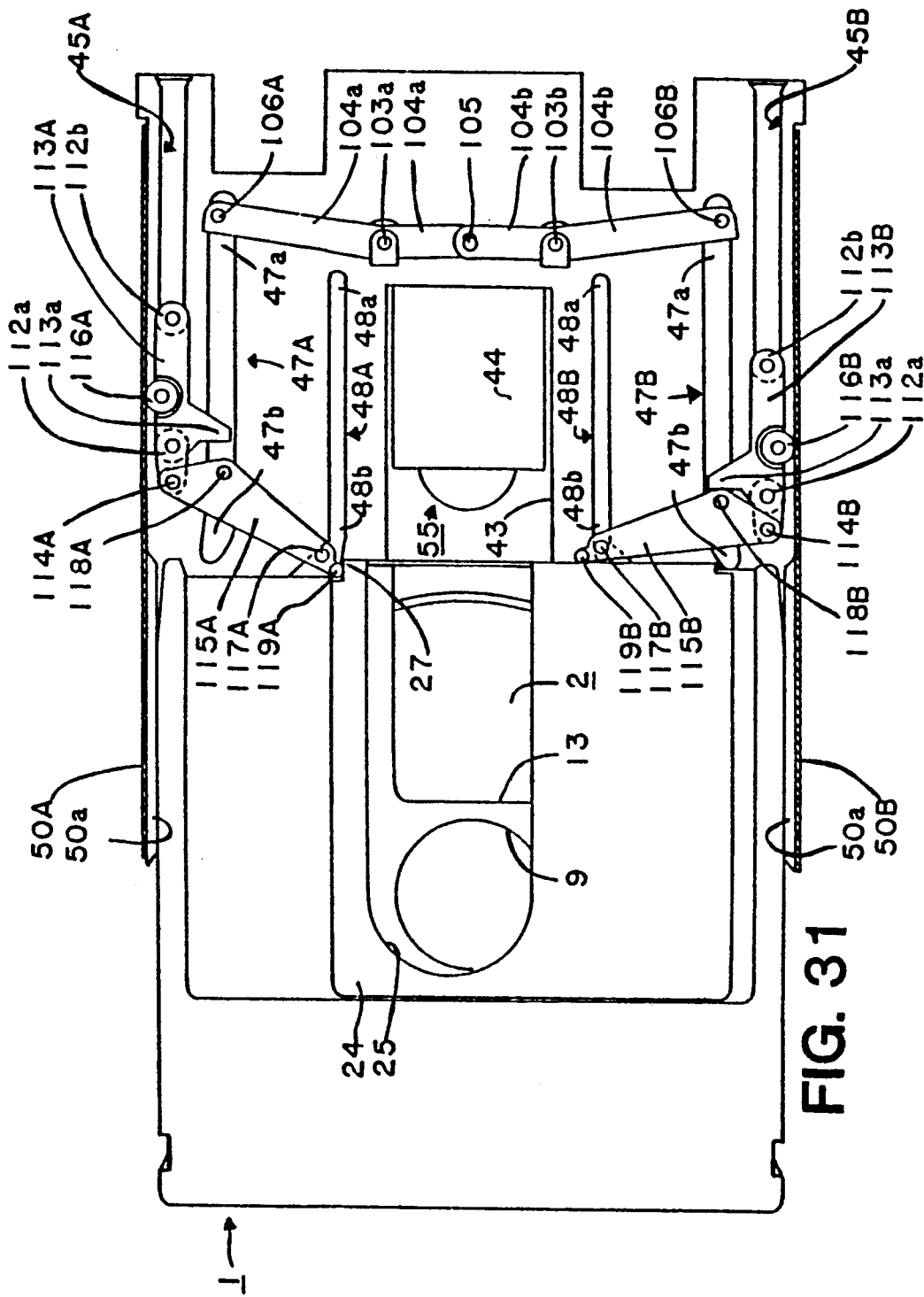
Figure 32:
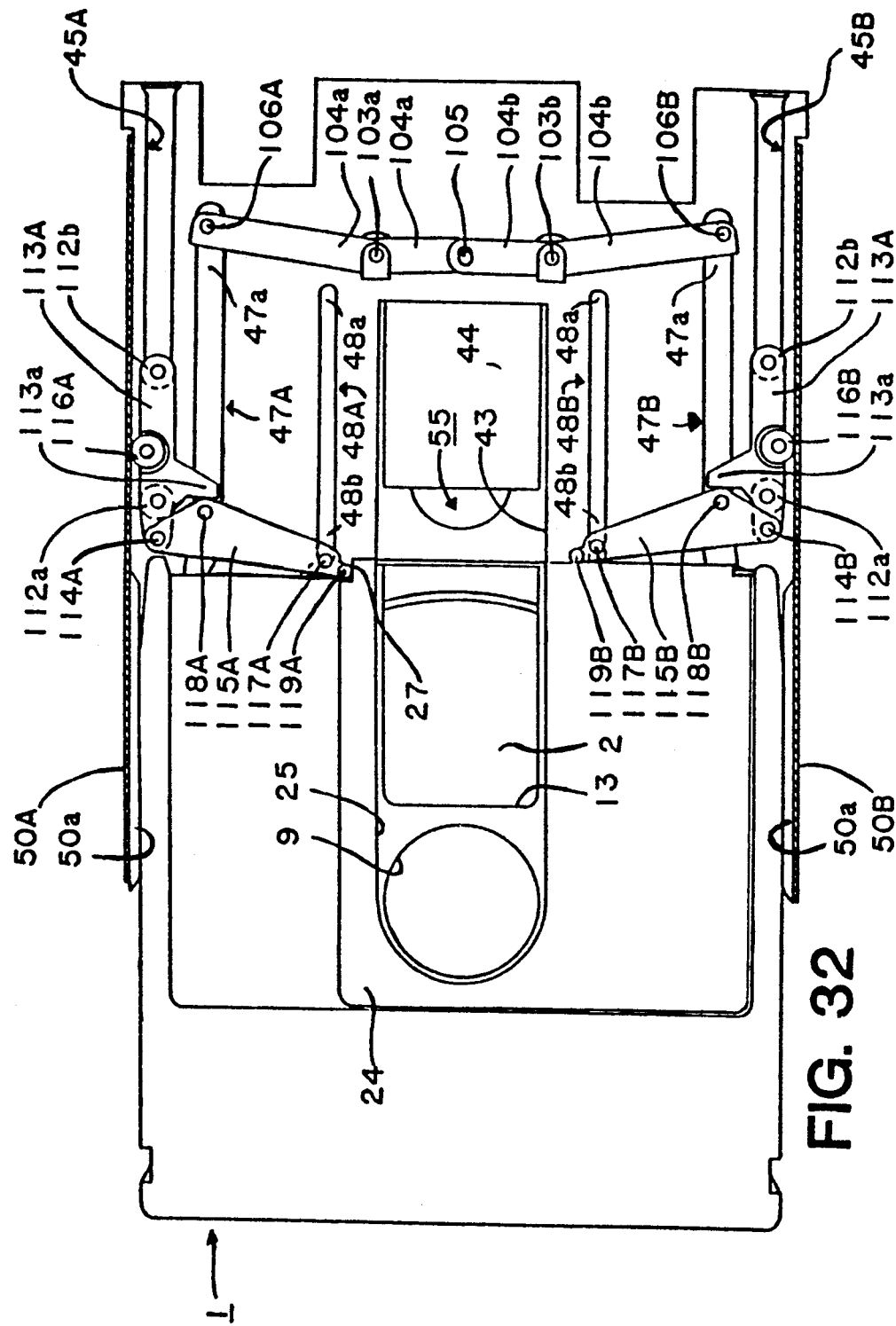
Figure 33:
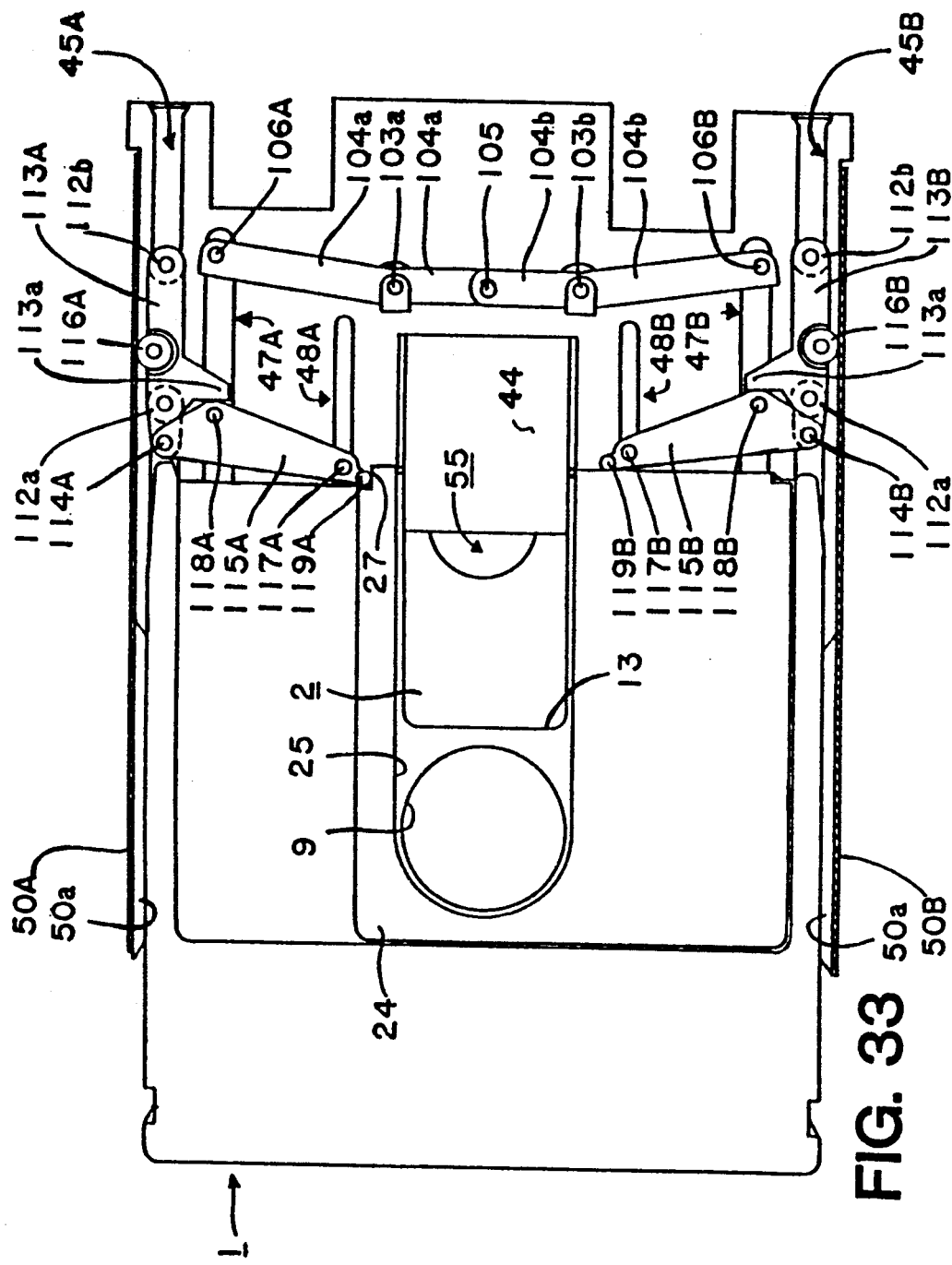

Along with further advancement of cartridge 1, the apparatus position will vary from that shown in FIGS. 30 and 31 to that of FIG. 32 in which the pin 117A of first arm 115A has reached the connecting point 48b between the crescent-shaped portion 49A and the rectilinear portion 48A of the slot 46A. While the pin 117A is being shifted in contact with the first extending edge 49b, the retreating step 49d and the second extending edge 49c, in due order, from the ejected position in FIG. 27 to the position in FIG. 32 which will be referred to as a "half-loaded position" in the following description, the pivot pin 114A must be slightly moved for leaving a predetermined distance from the pin 117A. This will be achieved by such arrangement that the slider 113A is allowed to be reciprocated along the slot 45A. The pin 118A trembles irregularly within the enlarged portion 47b of the slot 47A.

In FIG. 40, the shutter 24 has completely opened so that the spindle opening 9 and the head opening 13 on the cartridge 1 are entirely exposed through the shutter access window 25. With the shutter 24 completely opened, the narrowed portion 22c and 26 provide a recess for the bias magnet 55. During the further advancement of cartridge 1, disc 1 is free from contact with the bias magnet 55 which is secured to the apparatus at a level higher only by approximately 1 mm than the disc face when the cartridge 1 is loaded in the holder.

Along with further advancement of cartridge 1 from the half-loaded position shown in FIG. 32, due to continued engagement between the pin 119A and the notch 27, the pins 117A and 118A are being guided along the rectilinear portion 48A of the second slot 46A and the rectilinear portion 47a of the third slot 47A, respectively, thus shifting the first arm 115A to the right. The slider 113A accompanied by the pivot pin 114A is also moved to the right along the first slot 45A together with the arm 115A. The arm 115A is slided in the cartridge loading direction with its orientation kept unchanged by virtue of the extended flap 113a of the slider 113A which remains in contact with the apex of the arm 115A. The apparatus is thus advanced to the position of FIG. 34 through FIG. 23.

Figure 34:
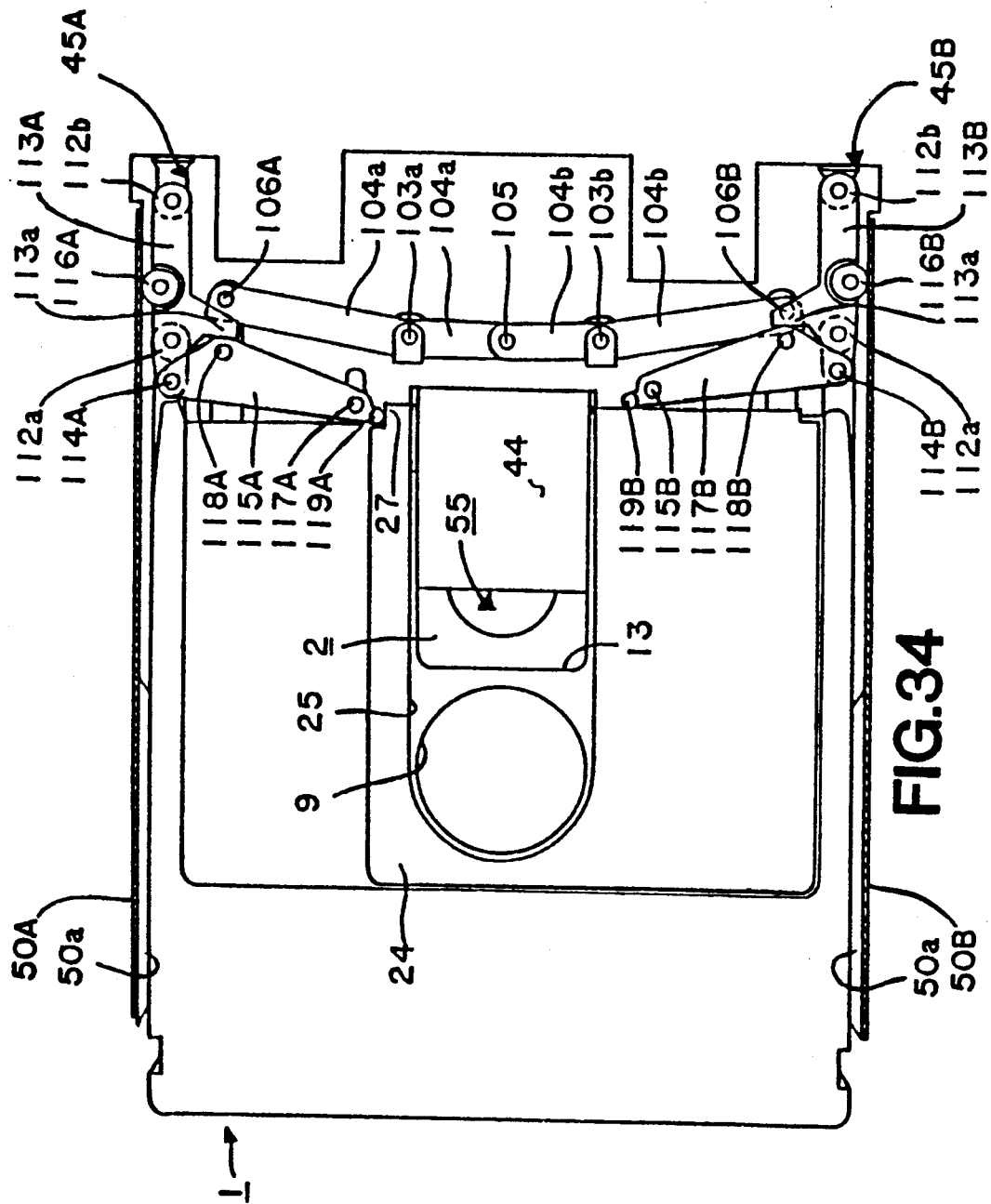

As described before, the second arm 115B will always go ahead of the first arm 115A. In FIG. 34, through the pin 118A of first arm 115A is still in the course of sliding movement along the slot 47A, the pin 118B of second arm 117B has already reached the rightmost end of the slot 47B, which push forward the leading end of the second link 104b. While the leading end of the first link 104a is not directly actuated by the pin 118A, it is operated in synchronism with the second link 104b by the aforesaid interlocking mechanism. With the synchronized but opposite-directing motion of the first and second links 104a and 104b, the push pins 106A and 106B projecting down from the leading ends of the links 104a and 104b respectively will be moved in the cartridge loading direction (to the right), which in turn push the extention 101 of the sliding plate locking arm 98 so that the arm 98 is rotated in the clockwise direction as best viewed in FIG. 20. The pin 100 is escaped from the recess 97 of the sliding plate 89, thereby releasing the locking condition of sliding plate 89, which results in that sliding plate 89 is moved to the ejection by means of the spring 95. The slot 94 formed in the bottom 89a receiving the pin 90 and the slot 93 in the side 89c receiving the pin 92 will provide guidance for sliding movement of the plate 89. As the sliding plate 89 moves in this manner, the base plate 58, which has been retracted in the stand-by position with the pin 85 received deep in the guide slot 96 of the sliding plate 89, will rotate in the clockwise direction to ascend to the operative position as shown in FIGS. 11 to 13 capable of performing desired recording and/or reproducing operation.

The sliding movement of the plate 89 will also govern the cartridge locking operation. More particularly, while the sliding plate 89 remains in the locked condition, as clearly shown in FIG. 19, the pin 109 of the cartridge locking lever 108 is received within a recess formed by the inner contact face 111 of the sliding plate 89, whereby the leading end 108b go outwardly away from the side wall of cartridge 1. When the sliding plate 89 starts sliding, the pin 109 is now in contact with the cartridge side wall so that the lever 108 is about to rotate in the clockwise direction but is prevented from doing so until the projection 108b enter the notch 21 formed near the rear end of cartridge 1. Thus, cartridge 1 can be supported in a definite position by the locking lever 108 which is operated along with the sliding movement of the plate 89.

It should be noted that the base plate ascending operation is performed with a slight time lag later than the cartridge locking operation. More particularly, at the time when cartridge 1 is locked in position, the pin 85 still stays halfway on the inclined edge of the slot 96 and therefore the base plate 58 has not reached the operative position. Still further movement of the sliding plate 89 will be enough to ascend the base plate 58 to the operative position as specifically shown in FIGS. 23 and 25.

As having been described, with the illustrated apparatus, the shutter opening operation is completed in the half-loaded stage. Then, after completely loading the cartridge 1 in the cartridge receiving space, the sliding plate 89 is released out of the locked condition to start sliding, whereupon the cartridge locking mechanism is made operative and immediately thereafter the base plate 58 reaches the operative position. Thus, there is provided the loaded position as shown in FIGS. 23 to 26 in which desired recording and/or reproducing operation can be performed. In the loaded position, a portion of the ejecting button 89b of the sliding plate 89 is protruded to the outside of the apparatus so as to provide for the cartridge ejecting operation to be described next.

After performing desired recording and/or reproducing operation, cartridge is ejected from the loaded position. This cartridge ejecting operation is carried out by operating by hand the button 89b to thereby advance the plate 89 toward the cartridge loading direction against the spring 95, which will actuate the base plate shifting mechanism and the cartridge locking mechanism in a fashion substantially reversed from in the aforementioned spring-back movement. More particularly, the pin 85 is guided along the inclined edge of the slot 96 to shift the base plate 58 down finally to the stand-by position against the spring 87. Further advancement of the sliding plate 89 will release engagement between the projection 108b and the notch 21 to set the cartridge 1 free from the locking mechanism. The sliding plate 89 is advanced until the pin 100 is received in the recess 97 for locking the plate 89 in the inoperative position. With the cartridge locking mechanism released, the arm 115 is pulled back by the spring 120, thereby ejecting and discharging cartridge 1 through the port 52. In the course of movement of the arm 115, the shutter 24 is closed at the half-loaded stage.

During the cartridge ejecting operation, the arm 115 will be moved from the full-loaded position in FIG. 34 to the half-loaded position in FIG. 32 in the reversed manner from during the cartridge loading operation. After passing through the half-loaded position in FIG. 32, however, the arm 115 will not take position shown in FIGS. 31 to 28 but is directly returned to the ejected position in FIG. 27 by the biasing force of the spring 120 which rotates the arms 115A and 115B about the pivot pins 114A and 114B, remained in the leftmost position as shown, in the opposite directions with the pins 117A and 117B guided along the arcuate edges 49a and 49a, respectively.

Although in the foregoing description use of one side of the cartridge 1 is contemplated, the apparatus of the illustrated embodiment is adapted to be used for the cartridge 1 of reversible type. The shutter opening mechanism is completely symmetric with respect to the center line extending in the cartridge loading direction. If the cartridge, as turned upside down, is loaded into the apparatus, the notch 27 will accomodate the pin 119B of the second arm 115B and the first arm 115A will at any time be ahead of the second arm 115B.

Although only a specific embodiment of the invention has been described in detail with reference to the accompanying drawings, it is to be understood that the invention is not limited to the illustrated embodiment and various changes and modifications may be made without departing from the scope and spirit of the invention as defined in the appended claims. For example, while on the apparatus illustrated herein there is fixedly mounted the bias magnet and therefore the cartridge shutter must be completely opened well before the full-loaded stage, which is established in this embodiment in the half-loaded stage, the apparatus may be so arranged as to open the shutter in the full-loaded stage if there is provided a means for shifting the bias magnet along with the cartridge loading and ejecting operation or in case of floppy disc drives requiring installation of no bias magnet. In such cases, the rectilinear portions 84 and 48a can be omitted from the second and third slots 46 and 47, respectively. Further, the function and operation of the pins 117 and 119 can be achieved by a single pin.

What we claim is:

1. A recording and/or reproducing apparatus for performing recording and/or reproducing operation with respect to a disc contained in a disc cartridge, comprising:

a main chassis;
a holder secured to said main chassis for accommodating the disc cartridge;
shutter actuating means for opening a laterally slidable shutter of the disc cartridge along with insertion thereof into said holder in a direction substantially perpendicular to the sliding direction of said shutter;
a base for mounting thereon a head for transducing signals from a recording medium in opposition to one side of the disc and a spindle motor for rotating the disc, said base being displaceable between a first position retracted away from said holder and a second position close to said holder to make operative said head and said spindle with respect to the disc contained in the full-loaded disc cartridge in said holder;
cartridge lock means for locking the disc cartridge in a full-loaded position, including a lock lever engageable with a corresponding engaging portion of the disc cartridge and first spring means for biasing said lock lever and said corresponding engaging portion is released;
detect means for detecting that the disc cartridge has reached the full-loaded position in said holder; and
control means operated in response to detection by said detect means to actuate said cartridge lock means against said first spring means to lock the disc cartridge in the full-loaded position and then to shift said base to said second position.

2. The apparatus according to claim 1 wherein said control means comprises a sliding plate connected to said main chassis slideably in the cartridge inserting/discharging direction, including first guide means for shifting said base and second guide means engageable with said lock lever to urge said lock lever to move against said first spring means; and second spring means for biasing said sliding plate to slide in the cartridge discharging direction.

3. The apparatus according to claim 2 wherein said detect means comprises a lock arm shiftably mounted on said main chassis and having an element engageable with a corresponding element of said sliding plate; and third spring means for biasing said lock arm to provide engagement between said element of said lock arm and said corresponding element of said sliding plate, said engagement being released when the disc cartridge reaches the full-loaded position in said holder to shift said lock arm against said third spring means.

4. A recording and/or reproducing apparatus for performing recording and/or reproducing operation with respect to a disc contained in a disc cartridge, comprising:

a holder for accommodating the disc cartridge;
shutter actuating means for opening a laterally slidable shutter of the disc cartridge along with insertion thereof into said holder in a direction substantially perpendicular to the sliding direction of said shutter;
a base for mounting thereon a head for transducing signals from a recording medium in opposition to one side of the disc and a spindle motor for rotating the disc, said base being displaceable between a first position retracted away from said holder and a second position close to said holder to make operative said head and said spindle with respect to the disc contained in the full-loaded disc cartridge in said holder;
cartridge lock means for locking the disc cartridge in a full-loaded position, including a lock lever engageable with a corresponding engaging portion of the disc cartridge and first spring means for biasing said lock lever toward a direction in which engagement between said lock lever and said corresponding engaging portion is released;
detect means for detecting that the disc cartridge has reached the full-loaded position in said holder; and
control means operated in response to detection by said detect means to actuate said cartridge lock means against said first spring means to lock the disc cartridge in the full-loaded position and then to shift said base to said second position.

5. The apparatus according to claim 4 wherein said control means comprises a sliding plate arranged slideably in the cartridge inserting/discharging direction, including first guide means for shifting said base and second guide means engageable with said lock lever to urge said lock lever to move against said first spring means; and second spring means for biasing said sliding plate to slide in the cartridge discharging direction.

6. The apparatus according to claim 5 wherein said detect means comprises a shiftable lock arm and having an element engageable with a corresponding element of said sliding plate; and third spring means for biasing said lock arm and said corresponding element of said sliding plate, said engagement being released when the disc cartridge reaches the full-loaded position in said holder to shift said lock arm against said third spring means.

7. A recording and/or reproducing apparatus for performing recording and/or reproducing operation with respect to a disc contained in a disc cartridge comprising:

a holder for accommodating the disc cartridge;
at least one arm member rotatably connected to said holder and engageable with the disc cartridge when the disc cartridge reaches a full-loaded position in said holder;

first spring means for biasing said arm member toward the cartridge discharging direction;

a base for mounting thereon a head for transducing signals from a recording medium in opposition to one side of the disc and a spindle motor for rotating the disc, said base being displaceable between a first position retracted away from said holder and a second position close to said holder to make operative said head and said spindle with respect to the disc contained in the full-loaded disc cartridge in said holder;

cartridge lock means shiftably connected to said holder for locking the disc cartridge in the full-loaded position, including a lock lever engageable with a corresponding engaging portion of the disc cartridge and second spring means for biasing said lock lever toward a direction in which engagement between said lock lever and said corresponding engaging portion is released;

detect means for detecting that the disc cartridge has reached the full-loaded position in said holder; and control means operated in response to detection by said detect means to actuate said cartridge lock means against said second spring means to lock the disc cartridge in the full-loaded position and then to shift said base to said second position.

8. The apparatus according to claim 7 wherein said control means comprises a sliding plate arranged slideably in the cartridge inserting/discharging direction, including first guide means for shifting said base and second guide means engageable with said lock lever to urge said lock lever to move against said second spring means; and third spring means for biasing said sliding plate to slide in the cartridge discharging direction.

9. The apparatus according to claim 8 wherein said detect means comprises a shiftable lock arm and having an element engageable with a corresponding element of said sliding plate; and fourth spring means for biasing said lock arm to provide engagement between said element of said lock arm and said corresponding element of said sliding plate, said engagement being released when the disc cartridge reaches the full-loaded position in said holder to shift said lock arm against said fourth spring means.

* * * * *